(12) United States Patent
James, III

(10) Patent No.: US 9,501,737 B1
(45) Date of Patent: Nov. 22, 2016

(54) METHOD AND SYSTEM FOR PREDICTION OF TIME SERIES BY KANBAN NEURON MODEL

(71) Applicant: Colin James, III, Colorado Springs, CO (US)

(72) Inventor: Colin James, III, Colorado Springs, CO (US)

( * ) Notice: Subject to any disclaimer, the term of this patent is extended or adjusted under 35 U.S.C. 154(b) by 356 days.

(21) Appl. No.: 14/301,081

(22) Filed: Jun. 10, 2014

Related U.S. Application Data

(63) Continuation-in-part of application No. 13/850,015, filed on Mar. 25, 2013, now Pat. No. 9,202,166.

(60) Provisional application No. 61/833,144, filed on Jun. 10, 2013, provisional application No. 61/835,293, filed on Jun. 14, 2013, provisional application No. 61/838,813, filed on Jun. 24, 2013, provisional application No. 61/724,622, filed on Nov. 9, 2012.

(51) Int. Cl.
  *G06F 15/18* (2006.01)
  *G06E 1/00* (2006.01)
  *G06E 3/00* (2006.01)
  *G06G 7/00* (2006.01)
  *G06N 3/02* (2006.01)

(52) U.S. Cl.
  CPC ..................................... *G06N 3/02* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,560,586 B1 * | 5/2003 | Liang | ........................ | G06N 3/08 706/25 |
| 6,947,915 B2 * | 9/2005 | Liang | ........................ | G06N 3/08 706/15 |
| 9,202,166 B2 * | 12/2015 | James, III | ................ | G06N 3/04 |

OTHER PUBLICATIONS

Kira Radinsky [Resources Tools] Susan Karlin IEEE Spectrum Year: 2015, vol. 52, Issue: 6 pp. 25-25, DOI: 10.1109/MSPEC. 2015.7115554 IEEE Journals & Magazines.*

An applicable short-term traffic flow forecasting method based on chaotic theory Jianming Hu; Chunguang Zong; Jingyan Song; Zuo Zhang; Jiangtao Ren Intelligent Transportation Systems, 2003. Proceedings. 2003 IEEE Year: 2003, vol. 1 pp. 608-613 vol. 1, DOI: 10.1109/ITSC.2003.1252024 IEEE Conference Publications.*

Prediction of physiological subsystem failure and its impact in the prediction of patient mortality Karla Caballero Barajas; Ram Akella Big Data (Big Data), 2015 IEEE International Conference on Year: 2015 pp. 1025-1030, DOI: 10.1109/BigData.2015.7363855 IEEE Conference Publications.*

Optimal pattern search for database systems R. Vangipuram; P. V. Kumarz; V. Janaki Pattern Recognition, Informatics and Mobile Engineering (PRIME), 2013 International Conference on Year: 2013 pp. 491-495, DOI: 10.1109/ICPRIME.2013.6496720 IEEE Conference Publications.*

* cited by examiner

*Primary Examiner* — Michael B Holmes
(74) *Attorney, Agent, or Firm* — Aspire IP; Yiu F. Au

(57) ABSTRACT

A system for prediction of statistical time series includes Kanban cells (KC), Kanban cell neurons (KCN), and Kanban neuron models (KNM). The KNM as applied may be used for predicting time series of financial marketplaces and of natural phenomena.

20 Claims, 17 Drawing Sheets

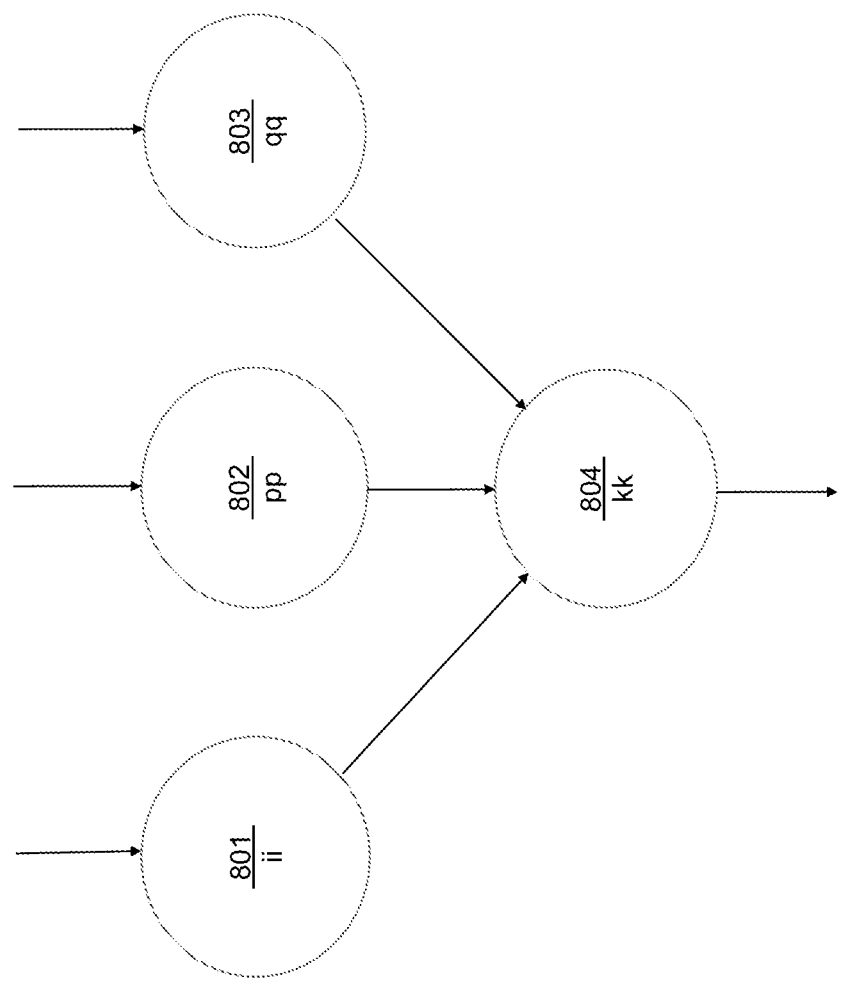

| 1210 Time | 1220 Market Values | | | | |
|---|---|---|---|---|---|
| 1211 Date | 1221 Close | 1222 Volume | 1223 Open | 1224 High | 1225 Low |
| 8/23/2013 | 8.60 | 4854834 | 8.68 | 8.68 | 8.55 |
| 8/22/2013 | 8.62 | 6809378 | 8.49 | 8.70 | 8.49 |
| 8/21/2013 | 8.48 | 7231771 | 8.56 | 8.59 | 8.45 |
| 8/20/2013 | 8.57 | 6967648 | 8.43 | 8.60 | 8.42 |
| 8/19/2013 | 8.45 | 8557999 | 8.49 | 8.56 | 8.41 |
| 8/16/2013 | 8.56 | 8324372 | 8.49 | 8.60 | 8.46 |
| 8/15/2013 | 8.47 | 7845211 | 8.53 | .8.60 | 8.41 |
| 8/14/2013 | 8.61 | 7866838 | 8.56 | 8.66 | 8.56 |
| 8/13/2013 | 8.59 | 5942974 | 8.58 | 8.61 | 8.47 |
| 8/12/2013 | 8.59 | 6622965 | 8.51 | 8.63 | 8.50 |
| 8/09/2013 | 8.55 | 8651606 | 8.59 | 8.63 | 8.52 |
| 8/08/2013 | 8.60 | 8360001 | 8.62 | 8.66 | 8.50 |

FIG. 12   1200

| 1310<br>Time | 1320<br>Natural Values | | | | | | |
|---|---|---|---|---|---|---|---|
| 1311<br>Date | 1321<br>Dew<br>point C | 1322<br>Pressure<br>kPa | 1323<br>Relative<br>humidity % | 1324<br>Dry tem-<br>perature C | 1325<br>Wind speed<br>km/h | 1326<br>Predicted<br>as observed | 1327<br>Random as<br>expected |
| 2013.1031.03:00 | 2.3 | 100.43 | 97 | 2.7 | 9 | 01 | 01 |
| 2013.1031.02:00 | 1.4 | 100.52 | 97 | 1.8 | 10 | 01 | 01 |
| 2013.1031.01:00 | 1.0 | 100.58 | 97 | 1.4 | 10 | 01 | 01 |
| 2013.1031.00:00 | 1.1 | 100.64 | 98 | 1.4 | 8 | 01 | 01 |
| 2013.1030.23:00 | 1.1 | 100.75 | 94 | 2.0 | 5 | 00 | 01 |
| 2013.1030.22:00 | 0.8 | 100.83 | 93 | 1.8 | 10 | 01 | 01 |
| 2013.1030.21:00 | 0.3 | 100.80 | 89 | 1.9 | 8 | 01 | 01 |
| 2013.1030.20:00 | -0.2 | 100.82 | 83 | 2.4 | 6 | 00 | 01 |

FIG. 13         1300

| 1411<br>Trade signal : Sell; Buy | 1421<br>Trade days | 1422<br>From start date | 1423<br>To end date | 1424<br>Period (t) |
|---|---|---|---|---|
| 110 002 | 15 | 2009.05.14 | 2009.07.30 | 252 |
| 111 002 | 9 | 2009.05.12 | 2009.06.01 | 252 |
| 111 002 | 15 | 2009.09.29 | 2009.10.19 | 504 |
| 111 003 | 19 | 2009.09.23 | 2009.10.19 | 504 |
| 112 001 | 13 | 2009.01.02 | 2009.09.09 | 252 |
| 113 002 | 35 | 2009.05.13 | 2009.07.29 | 252 |
| 221 002 | 13 | 2009.07.15 | 2009.09.09 | 252 |
| 221 003 | 15 | 2009.07.31 | 2009.10.14 | 252 |

FIG. 14      1400

| 1511<br>Cluster by 2 | 1521<br>Calculated prediction as observed | 1531<br>Random prediction as expected |
|---|---|---|
| 11 | 96 | 46 |
| 10 | 46 | 46 |
| 01 | 53 | 46 |
| 00 | 47 | 46 |
|  | $\chi^2 = 11.84 \ ; \ df = 3$ | $P <= 0.01$ |
|  | 1541<br>Contingency results | 1551<br>Fischer P |

FIG. 15   1500

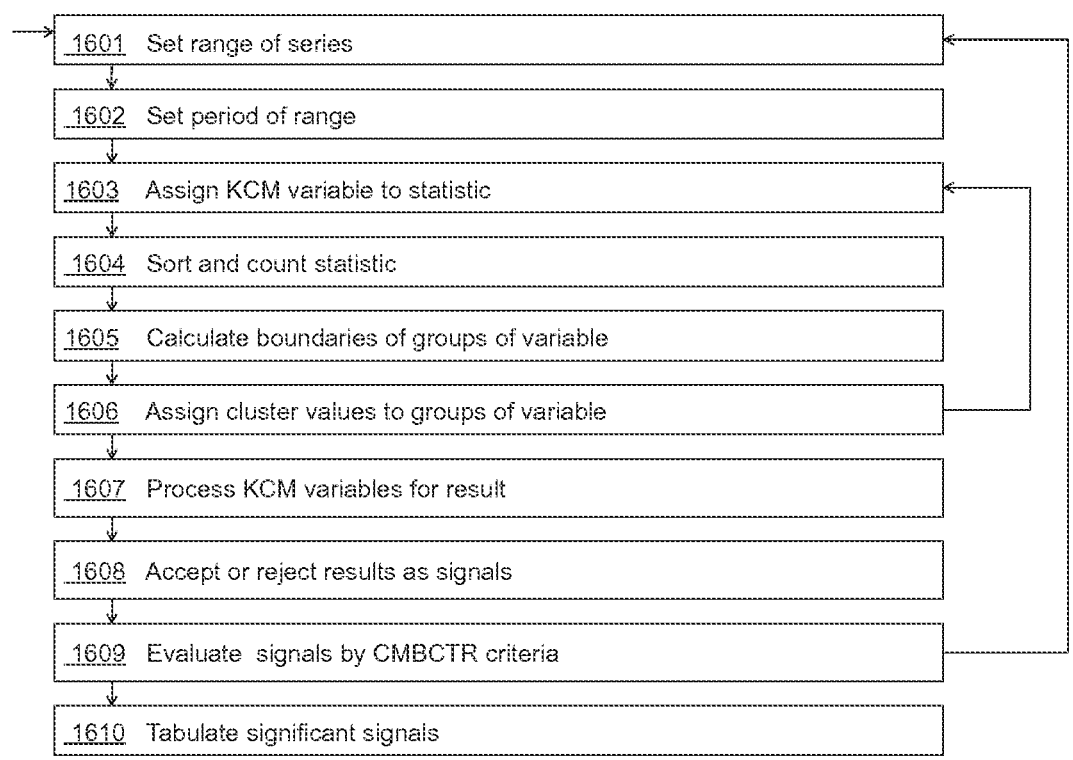
FIG. 16      1600

METHOD AND SYSTEM FOR PREDICTION OF TIME SERIES BY KANBAN NEURON MODEL

CROSS REFERENCE TO RELATED APPLICATION

The present application is a Continuation-in-Part (CIP) of U.S. patent application Ser. No. 13/850,015, filed Mar. 25, 2013, entitled "Method and System for Kanban Cell Neuron Network," which claims priority to U.S. Provisional Application No. 61/724,622, filed Nov. 9, 2012, entitled "Method and System for Kanban Cell Neuron Network;" the present application also claims the benefits of and priority, under 35 U.S.C. §119(e), to U.S. Provisional Application Ser. No. 61/833,144, filed Jun. 10, 2013, entitled "Prediction of Weekly Buy-Sell Signals for Commodity Futures and Options by Kanban Cell Neuron," U.S. Provisional Application Ser. No. 61/835,293, filed Jun. 14, 2013, entitled "Prediction of Weekly Buy-Sell Signals for Commodity Futures and Options by Kanban Cell Neuron," and U.S. Provisional Application Ser. No. 61/838,813, filed Jun. 24, 2013, entitled "Prediction of Daily Buy-Sell Signals for Stocks by Kanban Cell Neuron;" each of the above-identified applications being fully incorporated herein by reference.

BACKGROUND OF THE INVENTION

Field of the Invention

The present invention generally relates to the framework for prediction of time series, and more particularly to a method and system for generating predictive signals in statistics of economic marketplaces and of natural phenomena.

Discussion of the Background

Originally the Kanban cell (KC) was the production part of a linear pull system used to minimize the size, change, and turnover of parts inventory for the Just in Time (JIT) manufacturing of automobiles.

FIG. 1 shows the KC in the Petri net, a bipartite directed graph, and with or without a failure or idle subnet as an abstraction of the generalized stochastic Petri net (GSPN) of flexible manufacturing systems (FMS), which are push production systems (for example, using pallets to load incomplete parts and to unload completed parts by continuous transportation as by conveyer or automatic guided vehicle (AGV)).

In FIG. 1, system 10 is a Petri net of a Kanban cell (KC) disclosed in Colin James III, *Recent Advances in Logic Tables for Reusable Database Engines*, Proceedings of the American Society of Mechanical Engineers International, Petroleum Division, Energy Sources Technology Conference & Exhibition, Houston, Tex., ETCE99-6628, 1999 ("James 1999"), herein incorporated by reference in its entirety for all purposes. Step 104 is a transition. Step 101 is the input and output place. Steps 105 and 106 are feedback paths of the feedback loops of the paths 103 to 104 and 102 to 104. In this context, feedback paths serve as decision branches in the logic of the KC, and are commonly referred to in their totality as feedback loops. (Steps marked as m1, m2, m6, and t2 are true to the original labels and equivalent to the respective Steps 101, 102, 103, and 104.)

FIG. 2 shows similarity between the structure of the KC and the design of a universal accounting arithmetic system in N-dimensions, disclosed in James 1999 and Colin James III, *A Reusable Database Engine for Accounting Arithmetic*, Proceedings of the Third Biennial World Conference on Integrated Design & Process Technology, Vol. 2, p. 25-30, Berlin, Germany, 1998 ("James 1998"), herein incorporated by reference in its entirety for all purposes. Steps 201, 202, and 203 are descriptive of the respective symbols of Steps 101, 102, and 103 in FIG. 1. Steps 204, 205, and 206 are descriptive of the respective symbol of Step 104 in FIG. 1. Step 207 is keyed to the respective Step 107 in FIG. 1. Steps in FIG. 2 describe how a KC system performs the identical functionality of a disparate system, heretofore not related solely to the field of manufacturing, and hence indicate that the KC is a universal mechanism for abstract processing of any kind.

In FIG. 2, system 20 is an accounting arithmetic system disclosed in James 1998. Step 201 inputs a transaction type and the amount on which to operate. Step 202 uses a look up table (LUT) to translate the transaction type into an output index code. Step 203 uses another LUT to obtain the series of sequential logic switches by which to operate on the amount from Step 201. The input index of Step 203 is the output index of Step 202. Step 204 is the output of the account indexes and respective operators. The input index of Step 204 is the output from Step 203. Step 205 operates the series of sequential accounts by which the respective operators process the amount from Step 201. The accounts contain only a single balance value which is updated and overwritten. Step 206 is the update step by which an unbounded transaction log records the transaction type and amount from Step 201 and also a unique time stamp that verifies when Steps 201 through Step 205 are completed. Step 207 is a feedback loop from Steps 206 to Step 201 to restart the process for further inputs.

FIG. 3 shows a synchronous, self-timing neural network as a series of feedback loops.

In FIG. 3, system 30 is an abstraction of the KC applied to the biological neuron. System 30 consists of data places, through which data flows as data places 301, 311, and 321, and of timing places as timing places 302, 312, and 322, which stimulate the data places as 301, 311, and 321. The direction the data flows is bidirectional as in paths 305 and 306. The direction of timing paths is bidirectional as in paths 303 and 304. The timing places 302, 312, and 322 effectively open and close the data places 301, 311, and 321 to control when waiting data is allowed to flow. The timing places 302, 312, and 322 may be either physical clock cycles or logical looping structures, the duration for which constitutes a delay in system 30. System 301 supplies variable values to the system. The variable values are processed in steps 302 and 303 to produce a result in step 304.

In biology, a neuron is a cell nucleus and body with multiple dendrites as input paths, and a single axon as output path. The entry pathway of the dendrite to the neuron cell is a synapse and receptor where in the neurotransmitter fluid such as serotonin, ion transfers occur with calcium (Ca+), potassium (K+), and sodium (Na+).

Neural components can be represented as vector spaces such as an adaptive linear neuron or adaptive linear element (Adaline) composed of weight and bias vectors with a summation function (OR circuit), and also a multi-layered Adaline (Madaline) where two such units emulate a logical XOR function (exclusive OR circuit). Such components are examples of probabilistic methodology applied as an apparatus to map and mimic the biological neuron.

A "perceptron" can be represented as a binary classifier using a dot product to convert a real-valued vector to a single binary value which serves as a probabilistic methodology and apparatus to map and mimic the biological neuron.

A "spike neuron" or "spiking neuron" can be represented as a conductive network based on temporal or time bias and differential equations or calculus which serves as a probabilistic methodology and apparatus to map and mimic the biological neuron.

One deficiency with the neural network in the related art is that as it is based on a vector space, a solution is ultimately not bivalent, is probabilistic, and hence is undecidable. (That bivalency is not a vector space is disclosed in Colin James III, *Proof of Four Valued Bit Code (4vbc) as a Group, Ring, and Module*, World Congress and School on Universal Logic III, Estoril, Portugal, 2010 ("James 2010"), herein incorporated by reference in its entirety for all purposes.)

Another deficiency is that an exclusive OR (XOR) function is sometimes mistakenly developed in a neural network to mimic a neuron. The logical XOR connective is orthogonal or effectively perpendicular as a mathematical operator. However, biological bodies are not rectilinear, but rather based on a phi or Phi ratio of $(1\pm(5^{\wedge}0.5))/2$, and meaning that there are no right angles (90-degree arcs) in biology per se. While the logical XOR connective may be constructed from the NOR or NAND logical connectives, there is no evidence that the XOR function is built into the neuron, or necessarily should be.

Yet another deficiency with the related art is that the perceptron and spike neuron can accept any input without discrimination.

SUMMARY OF THE INVENTION

Therefore, there is a need for a method and system for the Kanban neuron model (KNM) to predict statistical time series; to address the above deficiencies and other problems; and to process data predictions quickly.

One advantage of the present invention is to provide evaluation of statistical time series data into a non-vector space that is not probabilistic and hence ensures bivalency and decidability.

Another advantage of the present invention is to provide evaluation of statistical time series data solely with linear operators such as the OR and AND logical connectives, that is, with only the linear atomic arithmetical operations of addition and multiplication and to provide input values as multi-valued logic such as in the 2-tuple set of {"00", "01", "10", "11"}.

Yet another advantage of the present invention is to provide a KNM that is based on cluster logic of arithmetic applied to data groupings, and which does not rely on statistical Grey systems, physical Kalman filters, data base support vector machines, or hybrid ensembles.

The above and other needs are addressed by embodiments of the present invention, which provide a system and method that advantageously uses bivalent multivalued logic (MVL) such as four-valued logic (4VL) of four-valued bit code (4vbc) or four-valued logic with null (4VLN) and four-valued bit code with null (4vbcn).

Accordingly, in one aspect, a method of predicting time series includes setting a range of the time series and a period of the range, clustering and assigning variables of the time series to a combinatorial logic model, processing the combinatorial logic model on the variables for one or more results, accepting or rejecting one or more of the results and the corresponding variables of the results as signals, evaluating the signals by combinatorial contrast criteria for significant signals, and applying the significant signals to the time series as predictions.

In another aspect, an apparatus for predicting time series includes a combinatorial logic model and a non-transitory computer readable medium storing instructions for setting a range of the time series and a period of the range, clustering and assigning variables of the time series to the combinatorial logic model, processing the combinatorial logic model on the variables for one or more results, accepting or rejecting one or more of the results and the corresponding variables of the results as signals, evaluating the signals by combinatorial contrast criteria for significant signals, and applying the significant signals to the time series as predictions.

In yet another aspect, a non-transitory computer readable medium includes instructions for setting a range of the time series and a period of the range, clustering and assigning variables of the time series to a combinatorial logic model, processing the combinatorial logic model on the variables for one or more results, accepting or rejecting one or more of the results and the corresponding variables of the results as signals, evaluating the signals by combinatorial contrast criteria for significant signals, and applying the significant signals to the time series as predictions.

Still other aspects, features, and advantages of the present invention are readily apparent from the following detailed description, simply by illustrating a number of exemplary embodiments and implementations, including the preferred mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings:

FIG. 8 illustrates a flow diagram of the KCN using symbols for nodes according to an embodiment of the invention.

FIG. 12 illustrates an exemplary statistical time series of market data for the stock issue HBAN (Huntington Bancshares).

FIG. 13 illustrates an exemplary statistical time series of natural data for the weather station YOW (International Airport, Ottawa, Canada).

FIG. 14 illustrates examples of profitable trade signals for the stock issue symbol HBAN (Huntington Bancshares) after an application of the KNM.

FIG. 15 is a detailed example for the statistical tabulation and results of weather data from the Canadian weather station at YOW (Ottawa International Airport).

FIG. 16 illustrates a method of predicting time series according to an embodiment.

DETAILED DESCRIPTION OF THE PREFERRED EMBODIMENTS

Figure 1:
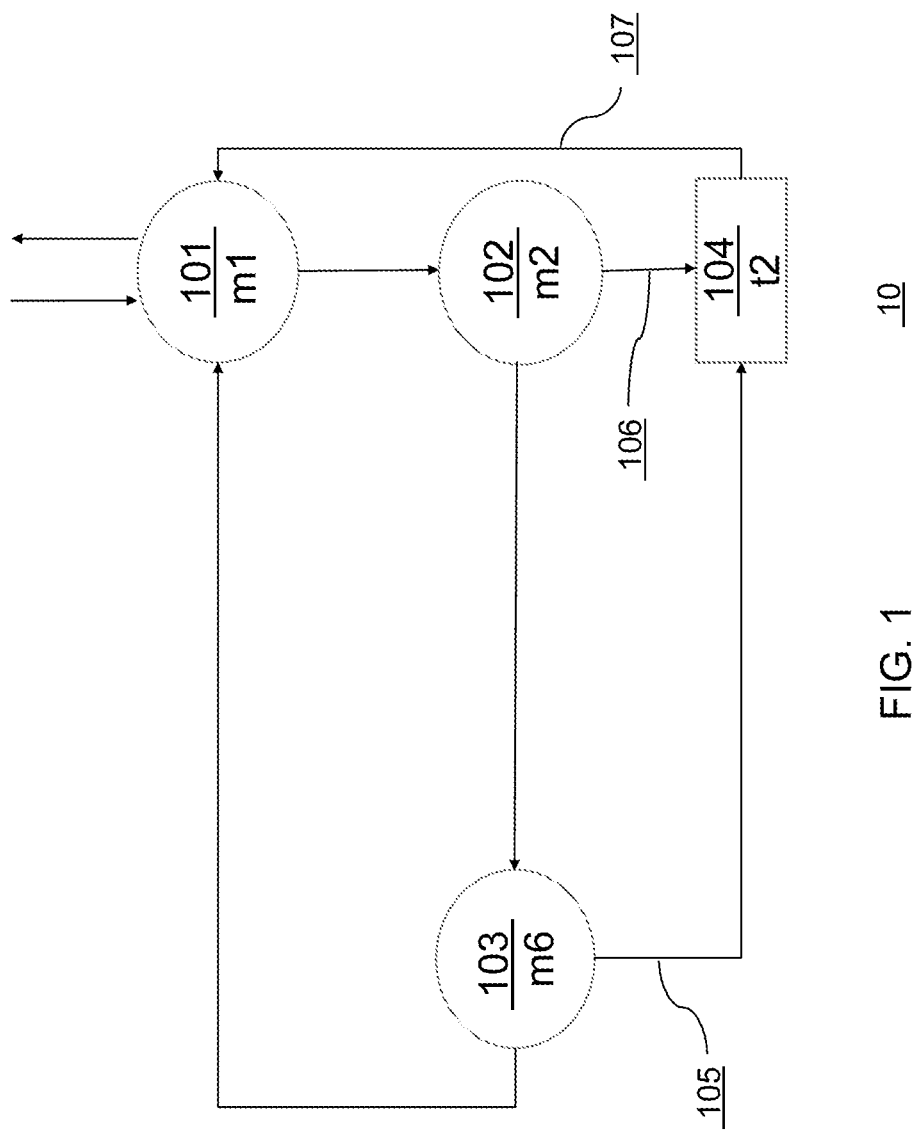
FIG. 1 illustrates a KC in the Petri net according to the related art.
Figure 2:
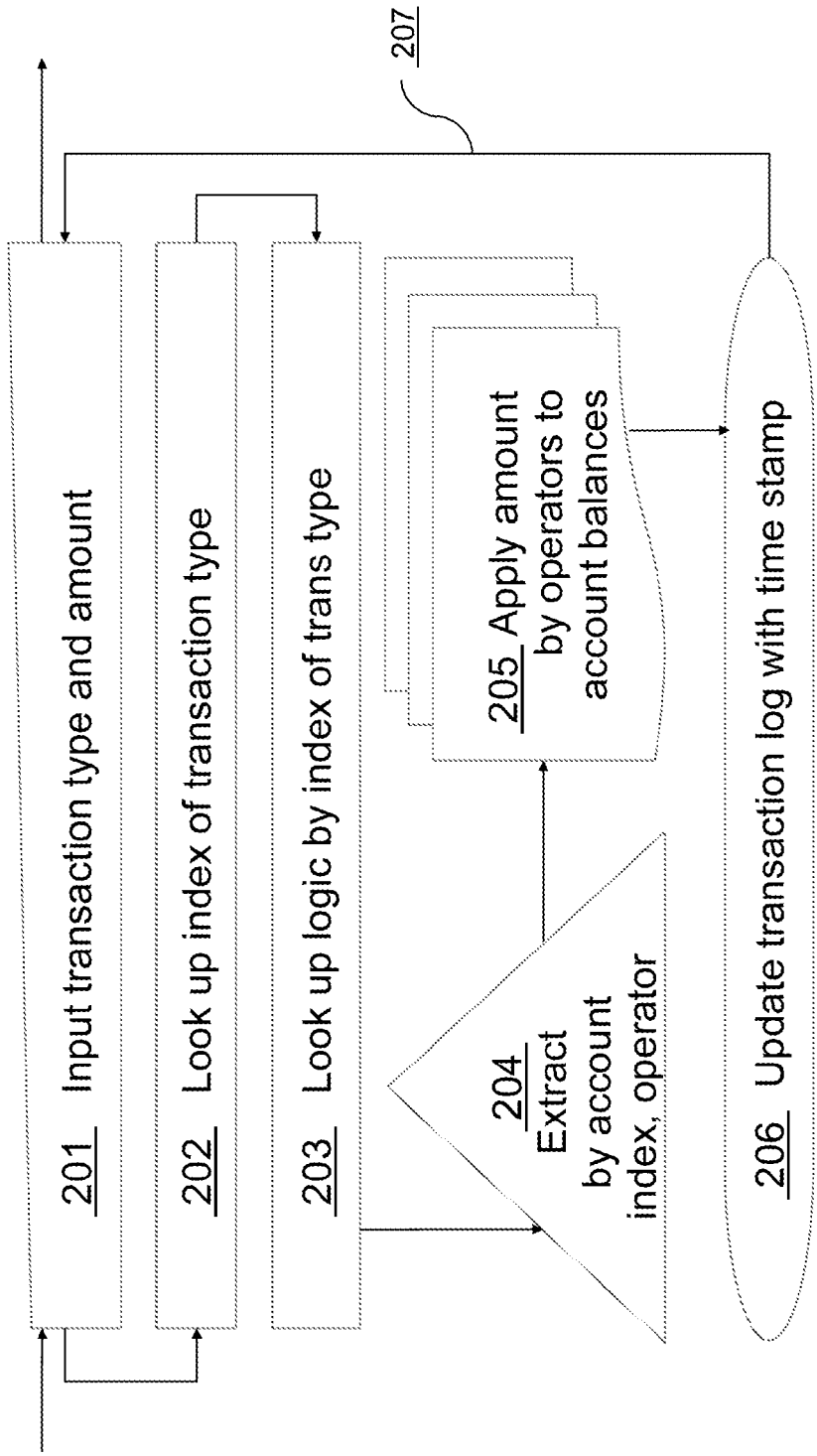
FIG. 2 illustrates an accounting arithmetic system in N-dimensions according to the related art.
Figure 3:
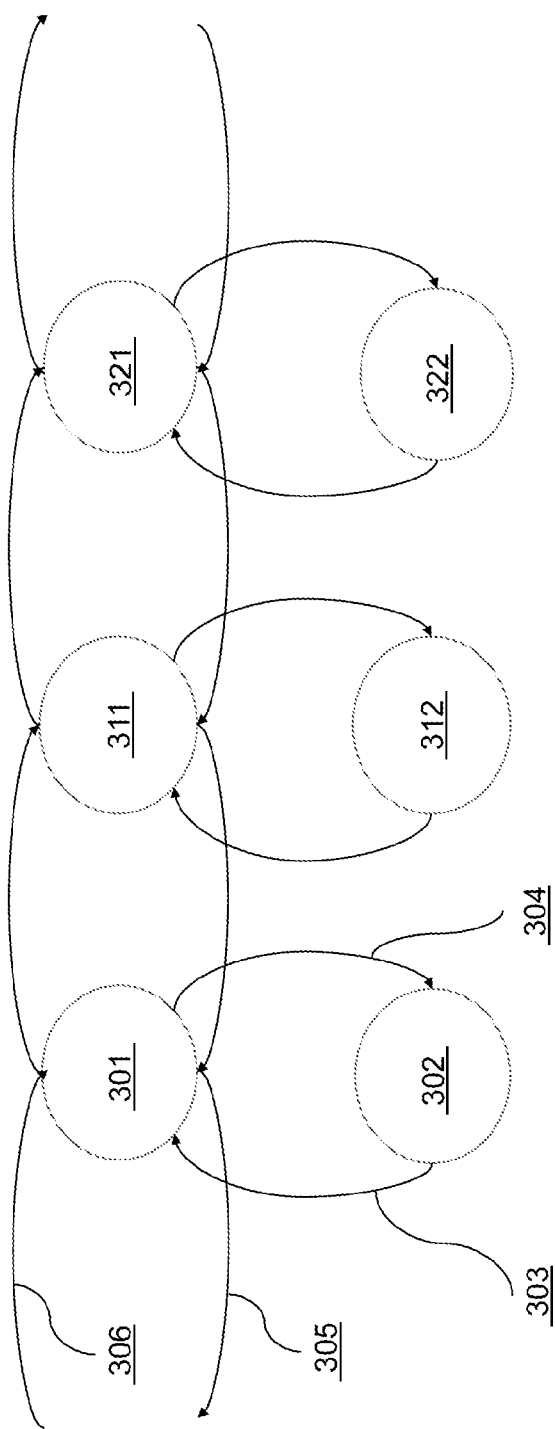
FIG. 3 illustrates a synchronous, self-timing neural network as a series of feedback loops according to the related art.

An introduction to the system is disclosed here.

The system described below is a massive forest or collection of trees with branches or bundles of leaves or nodes. A node is the Kanban cell (KC). A bundle is a Kanban cell neuron (KCN). A tree is cascaded KCNs, each with a Kanban cell level (KCL). A forest is a Kanban cell neuron network (KCNN or KCN2 or $KCN^2$, and pronounced KCN-Two or KCN-Squared). The KC is effectively a sieve that processes signals in a highly selective way. The KC is the atomic and logical mechanism of the system. Three KCs make up a KCN. Hence the KCN is a radix-3 tree. Multiple KCs as nodes at the same level form a KCL to better describe the KCN to which the KCs belong. The KCNN contains nine KCNs to produce one KCN result. Hence the KCNN is also a radix-9 tree.

The KCN maps the biological mechanism of the human neuron as a series of 9-dendrites that process input signals concurrently into 1-axon, the path of the output signal. The input signals are equivalent to the logical values of null, contradiction, true, false, and tautology. These are respectively assigned as a 2-tuple of the set {" ", "00", "01", "11"} or as the set of {" ", 0, 1, 2, 3}, depending on which set of valid results is required.

As a sieve, the KCN filters three input signals into one output signal. The number of all input signals to produce one valid output signal as a result is in the ratio of about 15 to 1. The computational or machine mechanism to accomplish this is basically the same for software or hardware implementation. The core concept is that LUTs produce output results at a faster rate than by the brute force of computational arithmetic.

The theory of input signals is disclosed here.

The Kanban cell (KC) is defined as $$(ii_1 \wedge pp_1) \vee qq_1 = kk_1, \text{ where } \wedge \text{ is AND and } \vee \text{ is OR.} \quad \text{Equation (1).}$$

The Kanban cell neuron (KCN) is four of these connected KCs and is defined as $$(((ii_1 \wedge pp_1) \vee qq_1 = kk_1) \wedge ((ii_2 \wedge pp_2) \vee qq_2 = kk_2))$$
$$\wedge ((ii_3 \wedge pp_3) \vee qq_3 = kk_3) = kk_4. \quad \text{Equation (2).}$$

The utility of the KCN is that it matches the human neuron with 9-inputs as dendrites and 1-output as axon. The 9-inputs are: $ii_1$, $pp_1$, $qq_1$; $ii_2$, $pp_2$, $qq_2$; $ii_3$, $pp_3$, $qq_3$. The 1-output is: $kk_4$ This algorithm is the program for the KC.

Pseudo code is below to process input values of ii, pp, qq into kk according to one embodiment of the invention:

```
LET kk_lut = lut ( ii, pp, qq)   ! 3-D LUT indexed by ii, pp, qq for kk
LET kk_output = ii               ! Preset output kk to ii if test fails below
IF kk_lut ≠ ii THEN LET kk_output = kk_lut    ! iff LUT result <> ii
```

The input to the KC is in the form of 3×2-tuples or three dibit values as effectively a 2-tuple set of {ii, pp, qq}. To produce a single dibit value as kk output, the three input values are required. Hence the expression "3-inputs to 1-output" accurately describes the KC. When KCs are chained, three inputs are required to produce each of the three outputs accepted into the next consecutive KC, for a total of 9-input signals. This defines the KCN as the expression of "9-inputs to 1-output."

The number of inputs required in $KC_1$ to produce $KC_n$ is given by the formula of $$KC_n = 3^n, \text{ where } n>0. \quad \text{Equation (3).}$$

It follows that KCs in parallel and chained in succession represent a permutation of exponential complexities.

Each successively complex level of KCs hence has its number of KCs as a power of 9 (=3^2), such as $(3^2)^0=1$, $(3^2)^1=9$, $(3^2)^2=81$, ..., $(3^2)^n$.

The number of groups of signals of {ii, pp, qq} required for levels of KCs as KCLs may be tabulated. The number of groups where three groups are processed concurrently for KCL is the result of reducing the cumulative signals by a factor of three of the cumulative number of the groups of signals. For KCL-12 or $3^{13}$, the number of discrete signals is 1,594,323, and the cumulative number of KCNs is 531,444. For sizing in hardware implementation, each such result occupies 2-bits for a respective KCL-12 storage requirement of 1,062,882 bits.

A commonly published statistic is that on average there are seven to nine dendrites per neuron. This means two to three complete groups of signals (six to nine discrete signals) could be processed concurrently at receptor points for the dendrites along a neuron.

In the formula (ii AND pp) OR qq=kk of a KC in Equation (1), there are 64-combinations of 2-tuples (or dibits) of the set of {00, 01, 10, 11}. When ii and kk are the same value (ii=kk), this represents the condition where input is processed to the same output result. This also means there was no change to the input after processing. Consequently, this event marks the termination of processing for that particular signal, and hence the result is final. Such an event or condition produces no new logical result.

When ii, pp, or qq is "00", a contradiction is present to mean something is both true and false. This has the same effect as a null value because no logical information is disclosed other than that there is a void result. Consequently the values "00" and " " are folded together into " ". Hence the four-valued logical set of values as the 2-tuple of the set {"00", "01", "10", "11"} becomes {" ", "01", "10", "11"}. This is named four-valued logic with null (4VLN) composed of four-valued bit code with null (4vbcn).

All possible combinations of the values within the 2-tuple produce 64-values. A LUT is disclosed for these values and an index in the inclusive interval range of [0, 63]. It is named LUT-64. It appears in Table 1 and in the source code below, in which the DATA statements set forth the table by rank order.

This represents a sparsely filled LUT of three inputs {ii, pp, qq} to produce one output {kk} for a KC. When three KCs are combined to make a KCN, there are nine inputs to produce one output. This is named LUT-9 and is built by combining three LUTs of 64 entries each into 64^3 entries or 262,144 entries. The sparsely filled LUT-9S is indexed as (0 . . . 63, 0 . . . 63, 0 . . . 63).

Statistics for the percentage of signals processed from KCN-18 are disclosed. The signals accepted and rejected for the KCL-18 cascade are for input of 129,140,163 discrete random signals to a single result as a dibit (2-tuple) where 8,494.377 signals are accepted at about 7%, for a ratio of accepted signals to rejected signals of 1 to 13. This also indicates how the KCN overcomes the deficiencies of accepting all signals as in the related art described above.

Of interest is the relative distribution of the four-valued bit code (4vbc) for contradiction (00), true (01), false (10), and tautology (11). The logical results of the KCN favor the tautology (11) by about 34560/50432=69% over the other frequency of the other combined logical values. In the same way, true (01) and false (10) represent about (7936+7936)/50432=31%. These statistics imply that the KCN filters about: 2-valid assertions to 9-invalid assertions; equal numbers of true- and false-assertions; and 1-true or 1-false to 2-tautologies. By extension, this signifies that the KCN places an onus on rejecting invalid assertions and on finding tautologies. This also indicates how the KCN overcomes the problem of accepting all signals as in the related art described above.

Software implementation according to an embodiment of the invention is disclosed here.

The values in a LUT of 64-entries may be represented as the same respective values but in three different formats such as a natural number, the character string of that natural number, or character digits representing exponential powers of arbitrary radix bases. As numeric symbols, the four valid results are in the set of {0, 1, 2, 3}, and the invalid results are specified as a null set {−1}. As character string symbols, the four valid results are in the set of {"0", "1", "2", "3"}, and the invalid results are specified as a null set {" "}. As character string exponents, the four valid results are in the set of {"00", "01", "10", "11"} or {00, 01, 10, 11}.

The representation of the data elements within a LUT is important because the type of format affects the size of the LUT and the speed at which the data is manipulated. For example, to test a number for invalid result requires determining if it is a negative number, that is, is less than zero. The pseudo code for this is: IF n<0 THEN; or in the negative as IF NOT(n=0) THEN. (In logic it is often a more direct strategy to test for the negation of a proposition or an assertion.) To test a character string for an invalid result requires determining if it is a null character {" "}, that is, not within the set {"1", "2", "3"}. The pseudo code for this is: IF n$ < >" " THEN; or IF NOT(n$=0) THEN. A faster method is to test the length of the character string because a null string has a length of zero. The pseudo code for this is: IF LEN(n$)=0; or IF NOT(LEN(n$)=0). The main reason it is faster to test a character string rather than a number is the fact that in this context a number is represented by 8-characters of the IEEE format rather than by one literal character. The size of the LUT is also smaller for a literal character string: 64-elements as numbers occupy 64*8=512-characters, whereas 64-elements as characters occupy 64*1=64-characters or ⅛ less.

A LUT for 9-inputs [LUT-9] consists of a 2-tuple each (2-bits) to make 9*2=18-bits. The binary number 2^18 is decimal 262,144 or those numbers in the range of the inclusive interval of [0, 262143]. This means LUT-9 is an array indexed from 0 to 262,143 that is sparsely populated with kk results as {" ", "1", "2", "3"} for binary " ", 01, 10, 11. (The null symbol means that if it is used in a multiplication or exponential calculation, the resulting number is likely to raise exceptions.) The fill rate for the sparsely populated LUT-9 also shows that a single KCN rejects about 93% of all signals, and accepts about 7%. This reiterates how the KCN overcomes the deficiencies of accepting all signals described above.

The design flow of the software implementation consists of three parts: build the LUT (as above), populate the top-tier of the KCL with input values, and process the subsequent lower-tier KCLs. For testing purposes, the input values are generated randomly in the range interval of [0, 262143], that is, at the rate of 9-input signals at once. These are checked for results (valid or invalid) and used to populate the top-tier of KCL. The size of the top-tier level is determined by the maximum memory available in the software programming environment. In the case of True BASIC®, the maximum array size is determined by the maximum natural number in the IEEE-format which is (2^32)−1. The largest radix-3 number to fit within that maximum is (3^20)−1. However, the compiler system allows two exponents less at 3^18 (3^18.5, to be exact). Hence the top-tier KCL is set as KCL-18. Subsequent lower-tier KCLs are processed by string manipulation. Consecutive blocks of 9-signal inputs are evaluated for all valid results. The valid results as single ordinal characters are multiplied to the respective exponent power of four and summed into an index value for the LUT. If the indexed LUT result is a valid result, namely not null, then the result is stored at the point in the KCL tier. This phase constitutes KCN performance.

A method of building the LUT according to an embodiment of the invention is disclosed here. A single dimensioned, 64-element array is filled with the 14-valid results as single character literals and interspersed with the 50-invalid results as null values. The array is indexed sequentially in the interval range of [0, 63] by result. Three such arrays are combined into a three dimensional array of 64*64*64=262,144 elements. This serves to index the three inputs of {ii, pp, qq} into all possible combinations of results. This array is then evaluated for null results where NOT(ii$=kk$), NOT (LEN(ii$)=0), and NOT(LEN (kk$)=0). The respective elements are then designated as invalid results. To access the three dimensional array faster, it may be rewritten in a one dimensional array. This is because while the three indexes of ii, pp, and qq are conceptually easier to digest, a single index of 262,144 elements in the range interval [0, 262143] requires only one index value. Incidental arrays used to perfect the LUT may be re-indexed to zero or null to reclaim memory space. This table is named LUT-241K and is implemented in software as 2-tuples or 2-bits for 262,144*2-bits or 524,288 bits at 8-bits per byte for 64K bytes.

A LUT with a 6-character key according to an embodiment of the invention is disclosed.

The values of searchable element values for "iippqq" should also have the same key string-length, to enhance a radix search or binary search. Hence the numerical value of the index in the interval of [0, 63] is converted into a 2-character string value of the index in the interval ["00", "63"]. The subsequent indexes for the remaining two array dimensions are concatenated onto the first string index to form a 6-character key. The interval of digital search keys as

[000000, 636363] contains potentially 636,364 keys. However, this is not exactly the case as some keys are impossible because the range is sparsely occupied. Excluding consecutive null values at the extrema of the range, the interval range of valid keys is [010002, 586353], but again not all key combinations therein are possible as the frequency or cycle of valid results is in runs of four separated by blocks of seven nulls. This is named LUT-636K.

The Phi-hash LUT according to an embodiment of the invention is disclosed here.

Using a 1,148,219-element Phi-hash table versus the LUT-636K with 636,364-elements above occupies about 55% more memory space and is slower to process because the character string result values must be converted back to natural integers. The Phi-hash formula uses upper case Phi=$((5^0.5)-1)/2$ and hash_m=$2^21-(2^n)$, where n=19.8559, and hash (key)=Floor_INT(hash_m*((Phi*key) MOD 1)). The choice of n here is best determined by a test so as to minimize the size of the hash space. In other words, the hash space is just large enough to accommodate all hash values with finding a unique index within that space.

Software performance is disclosed here. Software simulation uses pseudo code of the educator's language of True BASIC® on a no-load, quad-core laptop with 8 GB RAM. Processing a LUT of 4VLN with the "00" values folded into the null " " is about 1% faster than without combining those values. Software performance favors the LUT-241K design using radix-4 arithmetic to build index values. This executes at the rate of 1,087,752 KCNs per second. The rate is based on processing 21,523,361 KCNs. This number of KCNs processed is derived from the Sigma permutation of $$\sum_{i=1}^{17} (3^{\wedge}(i-2)).$$ Equation (4)

Hardware implementation according to an embodiment of the invention is disclosed here.

Of critical importance to implementation in hardware is the particular hardware device(s) chosen. This is based on hardware sizing. In the case of LUT-241K, the size is 262,166 elements of 2-bits each or 524,588 bits (512 Kb) or 65,336 bytes (64 KB). However, additional bits are required to represent the KCLs of the KCNNs. These are calculated as a radix-3 function where $3^{\wedge}12$ or 531,441 entries at 2-bits each is 1,062,882 bits. The LUT and data structure occupy a total requirement of 1,587,470 bits. This example is directed to the use of many field programmable gate arrays (FPGAs) to build the KCNN system at a lower cost of less than $50 per target device. In addition, performance becomes a factor for faster or slower devices. On average, in hardware one access to LUT-241K takes 13.25 nanoseconds for processing at the rate of 1.8 BB KCNs per second, which is about 1,600 times faster than in software.

Detailed descriptions of the drawings follow.

Figure 4:
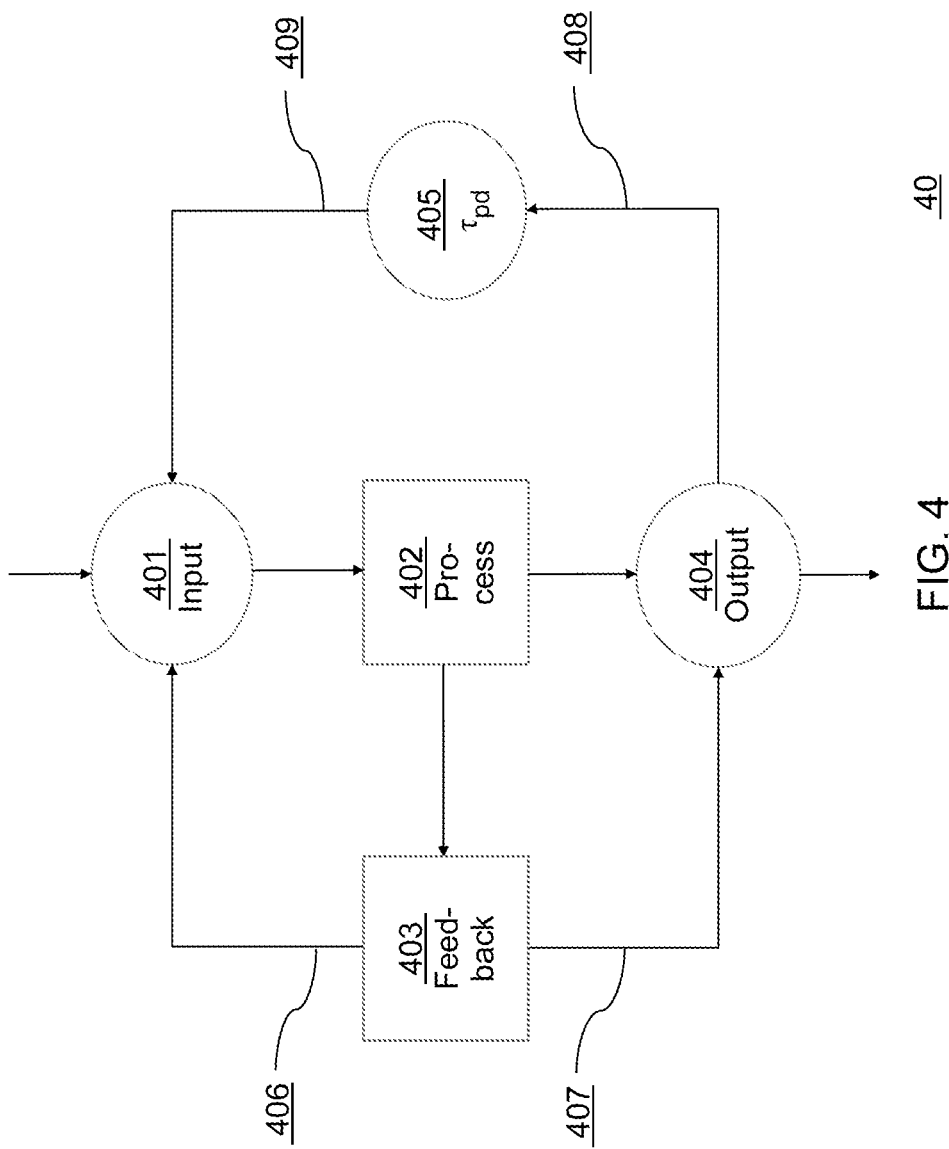
FIG. 4 illustrates the synchronous KC with feedback loops for external clock timing, named z-propagation delays (lower-case tau) according to an embodiment of the invention.

FIG. 4 illustrates the synchronous KC with feedback loops for external clock timing, named τ-propagation delays (lower-case tau).

Referring now to FIG. 4, there is illustrated a KC system 40 with feedback loops, according to an exemplary embodiment. Steps 401 and 404 are the respective input and output places. Step 402 is a process transition. Step 403 is a feedback transition. Step 405 is a tau-propagation place, such as an external clock. Step 406 is an untimed feedback path from 403 to 401. Step 407 is a process path from 403 to 404. Step 408 is a feedback path from 404 to 405. Step 409 is a continuation of the feedback path of 404 to 401 from 405 to 401. The two feedback paths are 406 and 408/409. Feedback path 406 is synchronous in that it is controlled by logical result from 403 to route data that is timing delay based on a decision, but not by a synchronous timing delay. Feedback path 408/409 is synchronous in that it is controlled by a propagation delay in 405.

Figure 5:
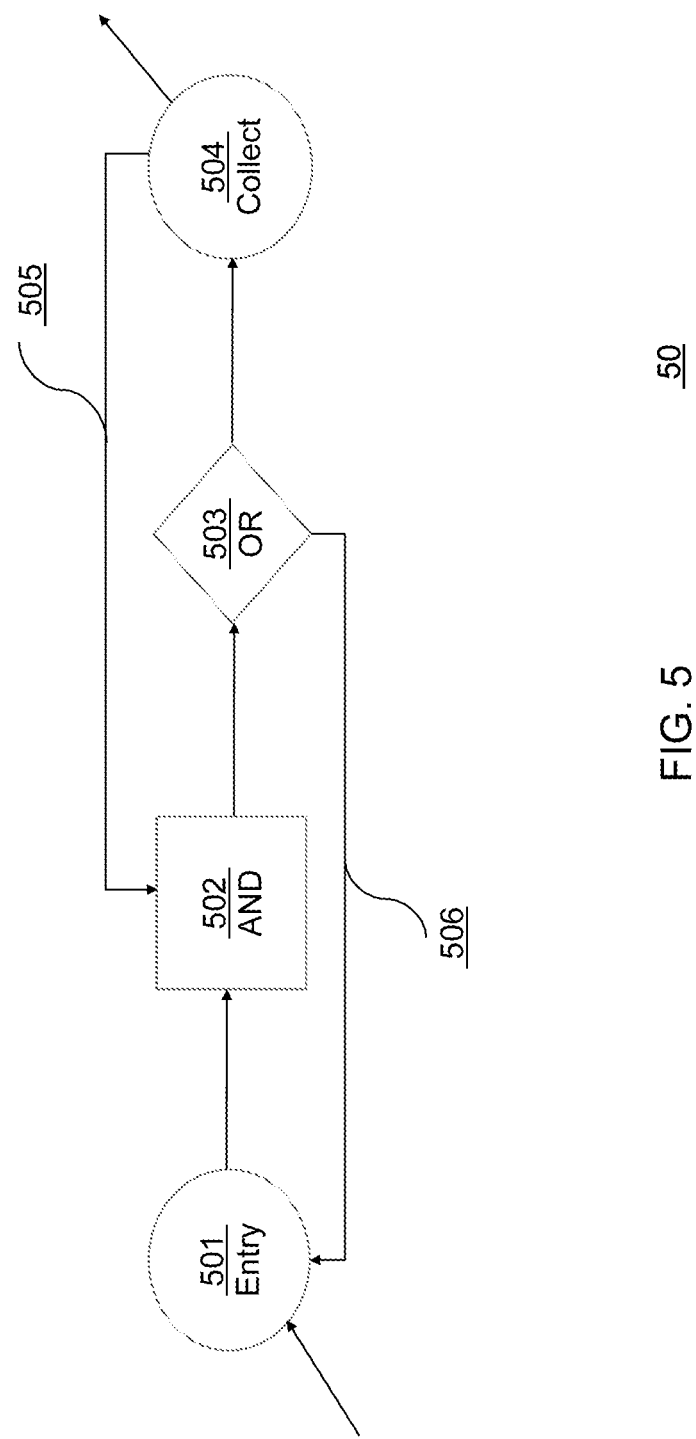
FIG. 5 illustrates a logical circuit for the KC that consists of multiple inputs, one output, and synchronous feedback loops according to an embodiment of the invention.

FIG. 5 illustrates a logical circuit for the KC that consists of multiple inputs, one output, and synchronous feedback loops.

In FIG. 5, system 50 is a logical circuit for the KC. Steps 501 and 504 are the respective input and output places, also named entry and collect nodes. Step 502 is a circuit for the logical connective of AND with the meaning of arithmetical multiplication. Step 503 is a circuit for the logical connective of OR with the meaning of arithmetical addition. The synchronous feedback paths are 506 from 503 to 501 and 505 from 504 to 502.

KC system 50 has feedback loops. Steps 505 and 506 represent back propagating paths, respectively analogous to 405 and 406 in FIG. 4. Exactly how these feedback paths are stimulated is a matter of sequencing, either by decision based on data, by external clock, or by both. This means system 50 is ultimately synchronous, and not asynchronous.

Figure 6:
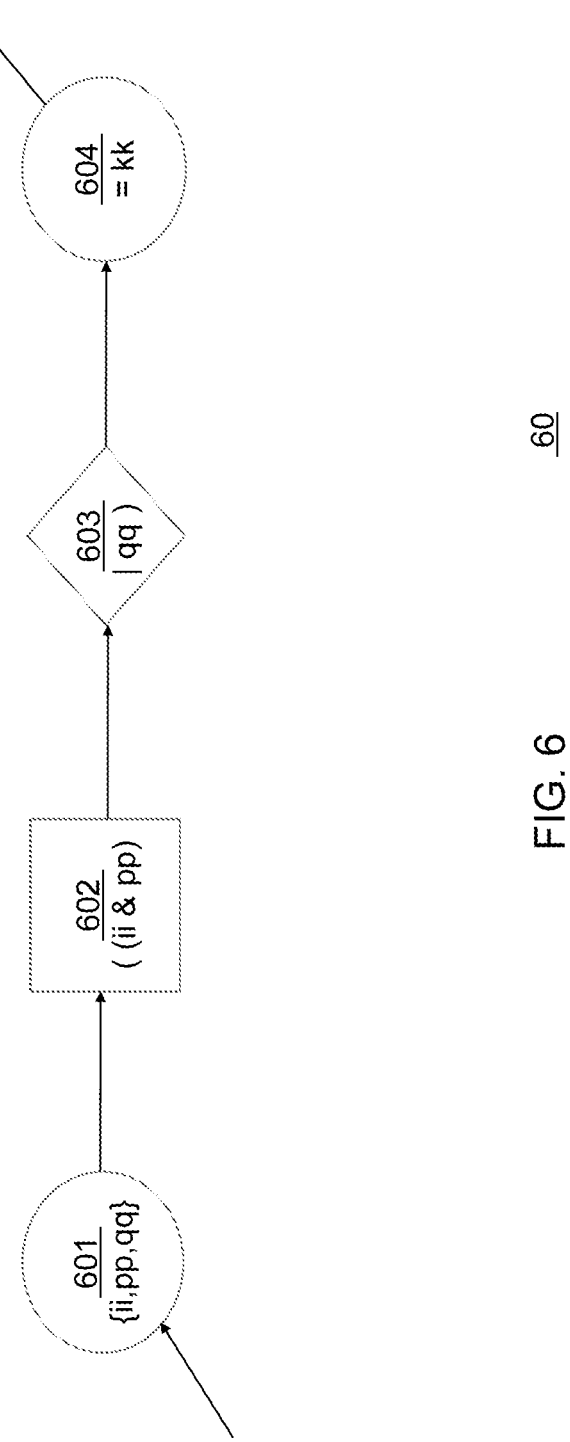
FIG. 6 illustrates a functional process diagram of the KC using symbols for nodes and processes according to an embodiment of the invention.

FIG. 6 illustrates a functional process diagram of the KC using symbols for nodes and processes according to an embodiment of the invention.

In FIG. 6, system 60 is a diagram of the KCN. Steps 601 and 604 are the respective input and output places. Step 602 is a circuit for the logical connective of AND. Step 603 is a circuit for the logical connective of OR.

KC system 60 includes two logical connective gates, an AND gate 602 and an OR gate 603. The signals specified to be processed are the set {ii, pp, qq} in 601 where ii AND pp is processed in 602, and that result is OR qq in 603 to produce the result renamed as kk in 604. Note that KC system 60 is a simplification of KC System 50 in that KC system 60 shows no feedback loops connecting from 603 to 601 or from 604 to 602, as is the case in KC system 50 from 503 to 501 and from 504 to 502. There are no feedback paths present. This means that system 60 is asynchronous or untimed by its data and with straight through data flow.

System 60 is made further unique by the method to terminate the input of signals to 601. If kk in 604 is determined to be equal to ii from 601, then this instance of system 60 stops processing. This feature inhibits system 60 from the otherwise potentially endless processing of results kk to 604. This method effectively makes system 60 into a self-timing KCN where the input ii of 601 and the output kk of 604 determine the next state of system 60 as active or dormant. This unique feature means that the KCN in system 60 is immune to external timing constraints and is wholly self-reliant for control of its asynchronous operation on its input and output data.

Figure 7:
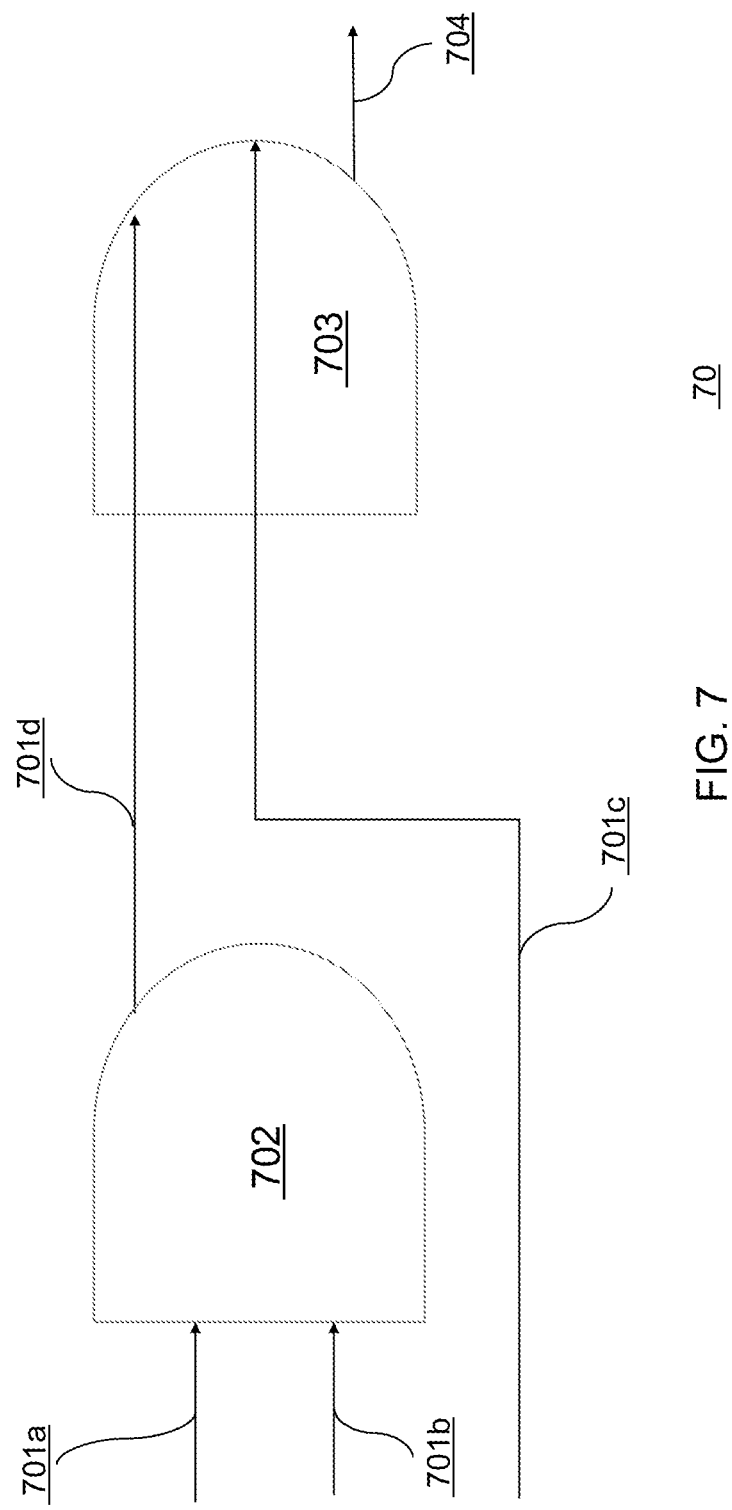
FIG. 7 illustrates an electrical diagram of the KC using symbols of Deutsches Institut für Normung (DIN) according to an embodiment of the invention.

FIG. 7 illustrates an electrical diagram of the KC using symbols of Deutsches Institut für Normung (DIN) according to an embodiment of the invention.

In FIG. 7, system 70 is an electrical diagram of the KCN using symbols of Deutsches Institut für Normung (DIN). Inputs of 701a, 701b, and 701c are processed to the output result of 704. The AND circuit is 702. The OR circuit is 703. Inputs 701a and 701b are processed in the circuit 702. Along with input 701c, the intermediate result of 701d is input into the circuit 703 and processed. The result is output as 704.

KCN system 70 illustrates the electrical embodiment of the logical diagram in KC system 70. The numbered labels therein are keyed in the last digits to the respective labels in KC system 60. The results from gate 702 as 701*d* and gate 703 as 704 may be determined by binary arithmetic (using the logical connectives of AND and OR) or by LUT result based on the inputs 701*a*, 701*b*, and 701*c*, and in either method to produce the result 704. It is the unique feature of system 70 that results are obtained directly by arithmetic computation or indirectly by LUT access. In the case of computation, there is no memory overhead for the size of a LUT. In the case of LUT access, there is no computational overhead for arithmetic. Therefore, system 70 is a generic embodiment of the KCN for faster computation-less or slower memory-less requirements.

FIG. 8 illustrates a flow diagram of the KCN using symbols for nodes according to an embodiment of the invention.

In FIG. 8, system 80 is an inverted ternary or 3-ary tree as a network diagram of the KCN with three inputs into one output, known as 3-to-1 processing. From previous operations, the respective kk results are in 801, 802, and 803. These serve as the subsequent inputs of ii, pp, and qq into 804 as a kk result. That in turn serves as an input to the next subsequent operations if any.

FIG. 8 maps the paths of signals named as nodes in a network tree for the embodiment of the KCN in system 80. The input nodes are for ii in 801, pp in 802, and qq in 803, and serve as three inputs in system 80 to produce one output for kk in 804. The signal values at any labeled location are automatically stored therein as data which is persistent for the duration of the electrical life of system 80 or until reassigned or erased.

Figure 9A:
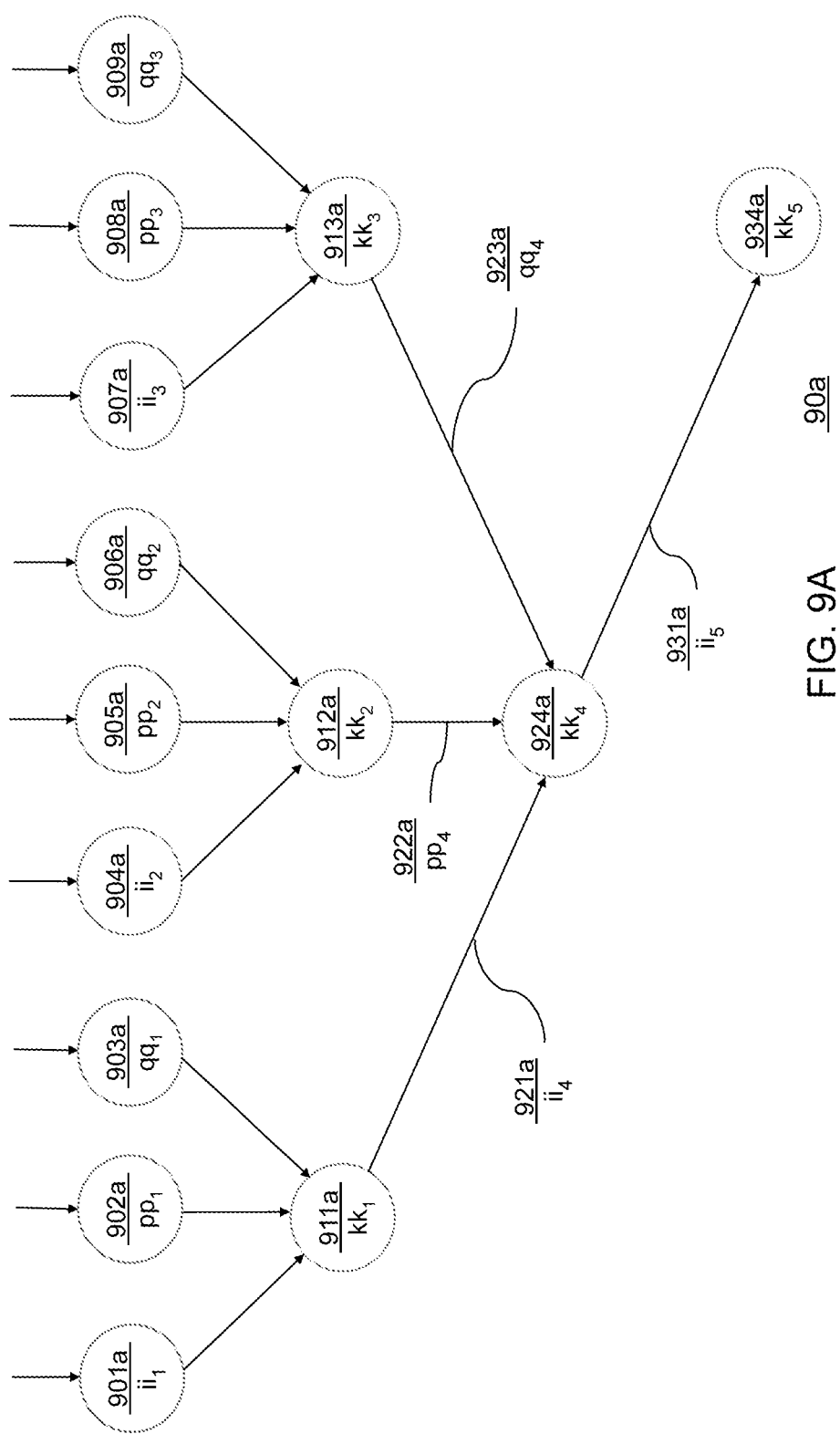
FIG. 9a illustrates a flow diagram of the KCNN with two cascading levels of KCNs using symbols for nodes according to an embodiment of the invention.

FIG. 9*a* illustrates a flow diagram of the KCNN with two cascading levels of KCN using symbols for nodes according to an embodiment of the invention.

In FIG. 9*a*, system 90*a* diagrams an exemplary KCNN that implements the KCN as nine inputs into one output, and named as 9-to-1 processing. Inputs 901*a*, 902*a*, and 903*a* result in 911*a*. Inputs 904*a*, 905*a*, and 906*a* result in 912*a*. Inputs 907*a*, 908*a*, and 909*a* result in 913*a*. Results 911*a*, 912*a*, and 913*a* are renamed respectively as 921*a*, 922*a*, and 923*a*. The input set of {901*a*, . . . , 909*a*} is a set of 9-values that produce 924*a* as a single output result. The result of 924*a* is renamed to 931*a* as one of three prospective inputs to the result in 934*a*.

FIG. 9*a* maps a plurality of the paths of signals named as nodes in a network tree for the embodiment of the KCN in system 80 above into the KCNN in system 90*a*. A unique feature is how consecutive outputs of kk in the set {$kk_n$, $kk_{n+1}$, $kk_{n+2}$} serve as inputs of the set {$ii_{n+3}$, $pp_{n+3}$, $qq_{n+3}$} to produce $kk_{n+3}$. This method effectively passes results from one level of the nodes in a network tree into the next level of the nodes in the cascade of the nodes in a network tree. This mechanism is inherently combined with the method above where individual KCNs become dormant when input ii is equal to output kk, to make the KCNN of system 90*a* terminate when signals are exhausted. For example, if $ii_1$ in 901*a* is equal to $kk_1$ in 911*a*, then $ii_4$ in 921*a* is null, not set to $kk_1$ of 911*a*, and 911*a* terminates that KCN. This means that, for a cascade of network paths to proceed, it requires no interruptions in the consecutive sequence of valid input values. Therefore if $kk_1$ in 911*a* is null, then any subsequent output value, such as $kk_4$ in 924*a* and $kk_5$ in 934*a* are null paths and no longer active. What follows from this is that $kk_2$ in 912*a* and $kk_3$ in 913*a* are also ignored by system 90*a*, and the next set of input signals, beginning with the unattached potential node 9*nn*, are potentially processed.

Figure 9B:
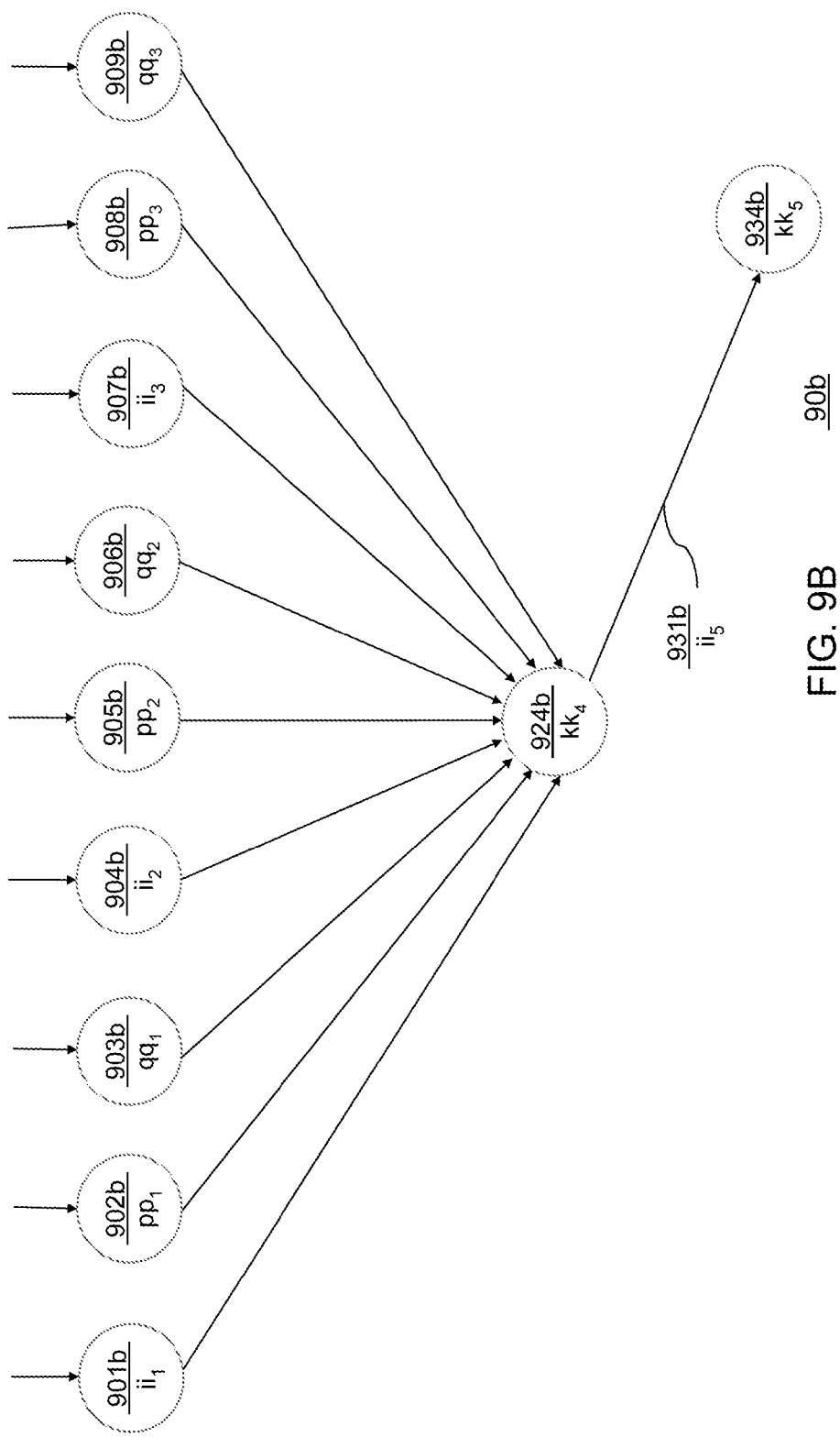
FIG. 9b illustrates a flow diagram of the KCNN with one input level of KCs using symbols for nodes according to an embodiment of the invention.

FIG. 9*b* illustrates a flow diagram of the KCNN with one input level of KCs according to an embodiment of the invention.

In FIG. 9*b*, system 90*b* diagrams an exemplary KCNN that implements as nine inputs into one output, a 9-to-1 processing, as a one step process. Inputs 901*b*-909*b* result in 924*b*. The result of 924*b* is renamed to 931*b* as one of three prospective inputs to the result in 935*b*.

System 90*a* markedly contrasts with system 90*b*. System 90*a* contains three 3-to-1 inputs KCs 911*a*-913*a* where the output of each of these KCs is processed by another KC 924*a*. System 90*b* contains the 9-to-1 inputs that is processed by 924*b*. Effectively, system 90*b* contains two cascading levels of KCs where 924*b* performs the processing of KCs 911*a*-913*a* and 924*a*.

In a preferred implementation, system 90*b* may be implemented using a LUT. The LUT is pre-filled with calculated results for output 924*a* from the nine inputs 901*a*-909*a* according to Equation (2). The LUT has the essential and special property that when the input and output are not identical (ii≠kk), the result is valid; however, when the input and output are identical (ii=kk), then the result is invalid. This property effectively limits the input and terminates the output of the KCNN. As such, about 93% of input signals would be rejected as invalid, and about 7% of input signals would be accepted as valid. The large proportion of possible invalid results allows for techniques to quickly filter out the invalid results during processing. Also, when the output KCNN is used as an input to a next level of KCNN, invalid results from the KCNN can be filtered out without processing the next level of KCNN. Further, a LUT table with this property is sparsely-filled and may be implemented in an efficient manner as known to one of ordinary skill in the art. An output result is obtained at the previous step or iteration to the termination of the process, at any point within a chain or cascade of the KCNN.

One distinguishing feature of the method of FIG. 9*b* is that if all input and output signals are acceptable and not null, then the output result of $kk_4$ in 931 may be obtained directly by one access to a LUT as indexed by the nine input signals in the set {$ii_1$, $pp_1$, $qq_1$, $ii_2$, $pp_2$, $qq_2$, $ii_3$, $pp_3$, $qq_3$}. In other words, system 90 is based on nine-input signals to one-output signal as in the ratio of (3^2) to 1 or 9:1. It is this embodiment of system 90 that performs most quickly, and hence is ideally suited for implementation in hardware over software. System 90 may be programmed to perform one or more of the processes of the described exemplary embodiments.

Further, in other embodiments of the invention, two or more cascading levels of the KCN systems may be implemented and scaled similarly to the two cascaded levels of KCs as in system 90*b*. In some implementations, these systems may be implemented using a LUT. The flexibility and scalability of these systems add to the robustness of embodiments of the invention for a number of applications. When the quantity of discrete inputs are scaled upwardly, the size of the LUT also expands at an exponential rate. As performance increases for memory and computing technology in the art, the size of the LUTs for KCNNs may also be viably increased for a specific application. Because such enormous LUTs remain as sparsely populated, compression techniques may also be invoked to collapse, stack, overlay, overwrite, and self-modify LUTs into different smaller spaces.

Figure 10:
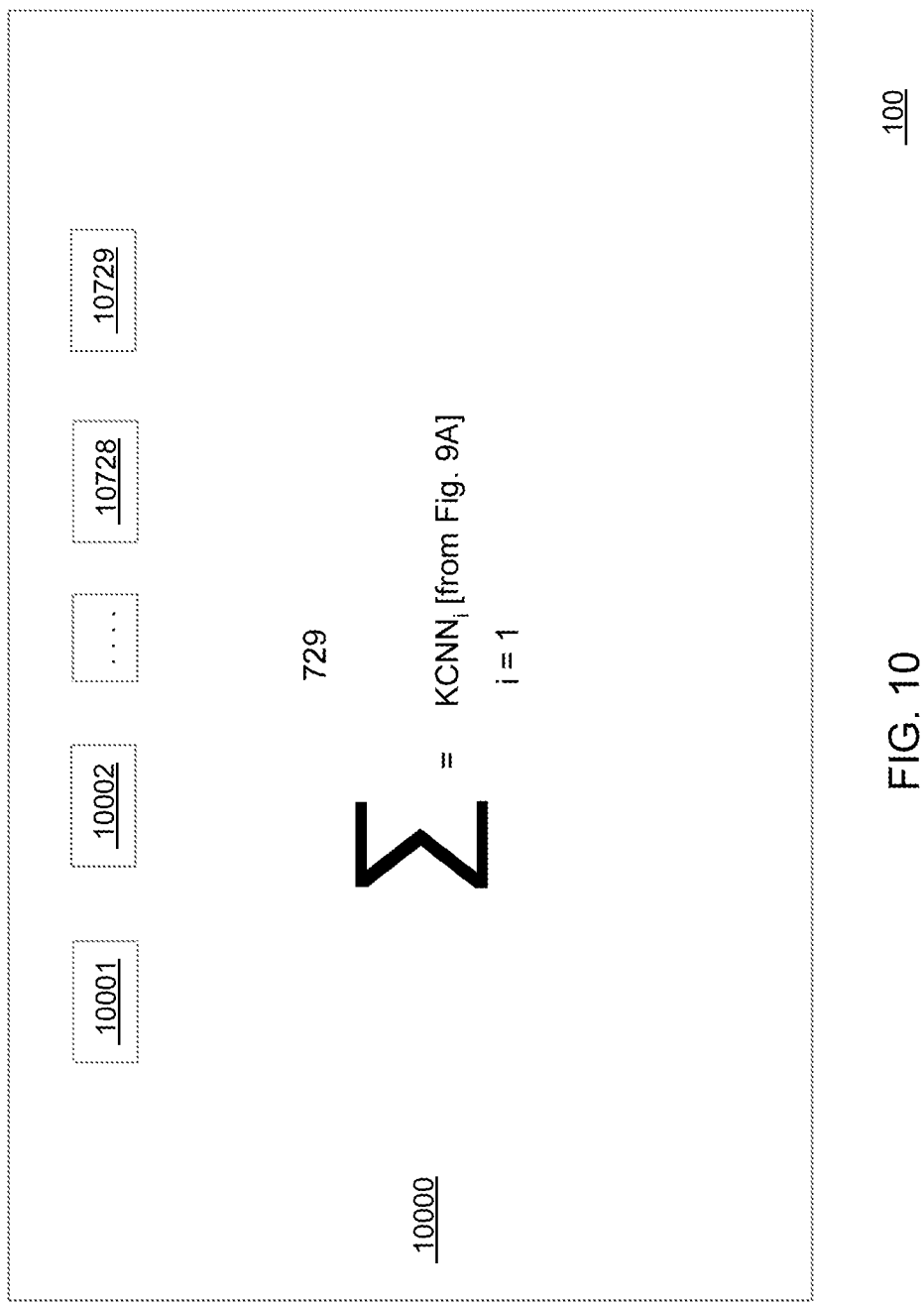
FIG. 10 illustrates a system level diagram of a plurality of KCNNs using blocks for individual KCNNs according to an embodiment of the invention.

FIG. 10 illustrates a system level diagram of a plurality of KCNNs using blocks for individual KCNNs according to an embodiment of the invention.

In FIG. 10, system 100 is a diagram of a plurality of KCNNs. There are 729 constituent KCNs named 10001, 10002, . . . , 10728, 10729. The total number of KCNNs is calculated by the summation formula named 10000 and read as the sum of KCNNs from 1 to 729.

FIG. 10 is an example of KCNNs mapping many biological neuron cells in system 100. Here about 94 billion KCNs (3^23 KCNs) are mapped by 729 KCNNs of the inclusive range of [10001, 10729]. This example is based on the limitation that the largest natural number of indexes to a LUT, as easily represented in 32-bit computing machinery, is about 2^32. That in turn limits the number of KCNs processed per KCNN with a LUT of 524,288 bits (65,536 bytes or 64 KB) to 21,523,361 KCNs per KCNN, as determined by the running sum of (3^(i−2)) for i from 1 to 17. If a complex programmable logic device (CPLD) or a FPGA contains about 3^17 KCNs, then such devices as KCNNs arranged in parallel sequence may easily map and quickly process large numbers of corresponding biological neuron cells. Hence system 100 represents the digital framework for processing about 94 billion biological neuron cells. System 100 may be assembled and programmed into a serial or parallel cascade as a computer system of KCNNs to perform one or more of the processes of the described exemplary embodiments.

In FIG. 10, a unique feature of the KCNN is that random input of 129 million signals (3^17) results in values for 43 million KCNs (3^16), but a single subsequent result value produced at the next lower level of 3^15 KCNs is infrequent at the rate of about 1.2%, from 10,000 tests of such random input to that KCNN. This means that the KCNN as implemented in the source code in True BASIC® below performs effectively as a two level network, or a tree of depth-2, after the non null input is randomly submitted in test.

Figure 11:
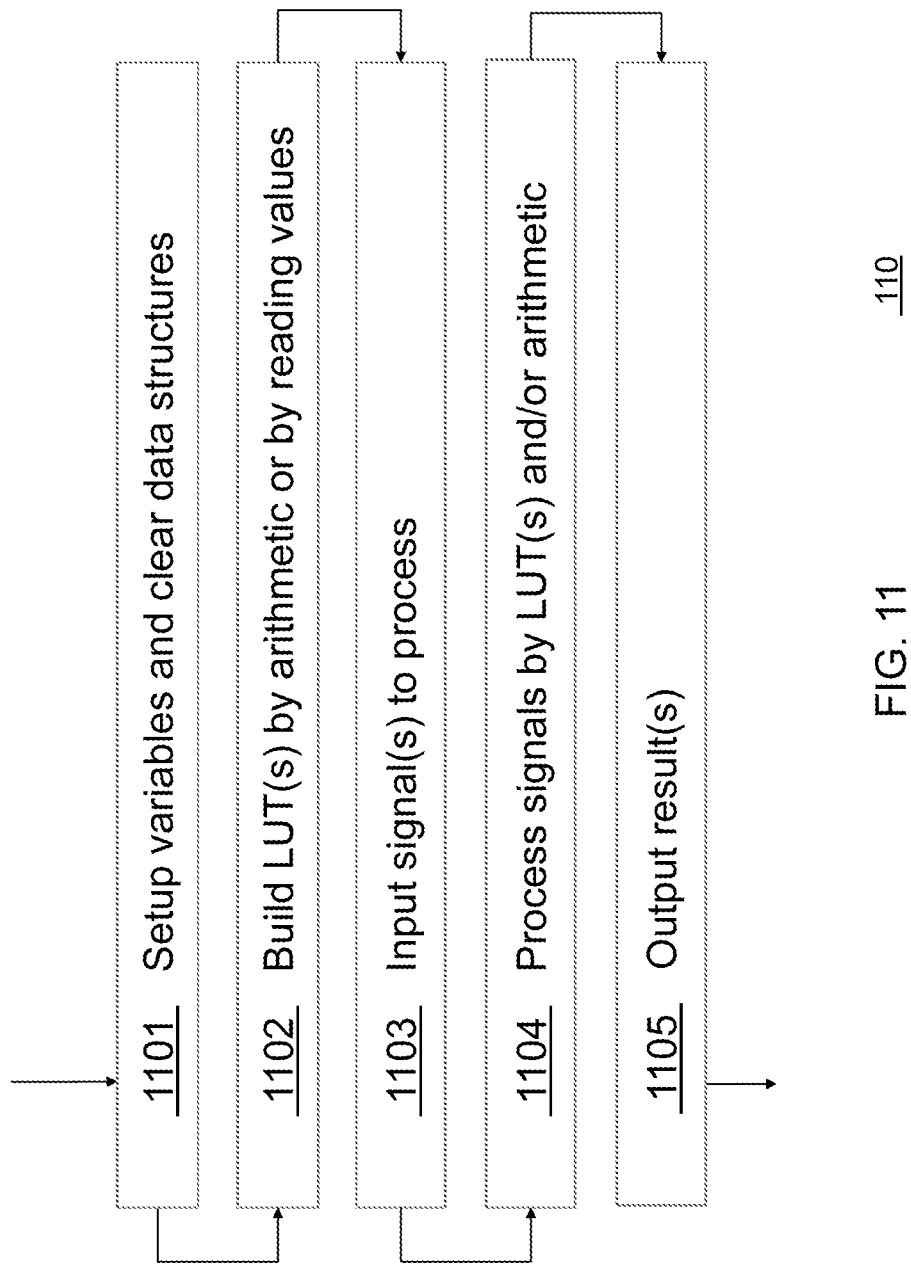
FIG. 11 illustrates a behavioral diagram of the KCNN using symbols for blocks of computer programming tasks according to an embodiment of the invention.

FIG. 11 illustrates a behavioral diagram of the KCNN using symbols for blocks of computer programming tasks according to an embodiment of the invention.

In FIG. 11, system 110 is the data flow diagram in software and hardware of the KCNN. In 1101, data structures and variables are initialized. In 1102, LUT(s) are built by arithmetic from primitives or by reading from a constant list of predetermined values. In 1103, signals to process are input. In 1104, results from input values are processed by LUT, by arithmetical calculation, or by both. The results from 1104 are output in 1105.

FIG. 11 contains the flow chart steps to program KCNNs in system 110. Of unique interest is the method to build LUTs in 1102. Results may be obtained by logical arithmetic, or LUTs may be constructed by either logical arithmetic or by reading data directly from a specification list, or a combination of both. However the size or extent of the LUT may be limited by the number and type of datum. The MVL chosen for exposition here, and not to be construed as a limitation, is 4VL or a 4vbc where the values are in the set {00, 01, 10, 11} and taken to express respectively in words the logical states of {contradiction, true, false, tautology} and the decimal digits of {0, 1, 2, 3}. A fifth value of null or " " is helpful for ease in programming.

Of unique interest to the method of system 110 is the rationale behind folding the 2-tuple "00" into null " ". Contradiction or "00" means "not false and not true" or in other words "true and false" as absurdum. Null on the other hand has the meaning of nothing or no value. Because absurdum imparts no information about the state of true (01), false (10), or tautology as "false or true" (11), then the informational value of absurdum is as void as to the state of falsifiability as is null. Hence the 4VL adopted in this exposition is the set {" ", "01," "10," "11"}. This means that whenever an input signal of "00" or " " is encountered, it short circuits and voids that KCN processing it.

The methodology for building the LUT for three inputs to one output is disclosed further and taught here. For the three input variables as in the set of {ii, pp, qq}, each variable of which is a 2-tuple as in the set of {" ", "01", "10", "11"}, there are 2^6 or 64-combinations possible, and typically indexed as in the inclusive interval range of [0, 63]. Of these 64-combinations, there are 14-combinations that do not include the value " ", as presented in Table 1 for the 14-combinations excluding " ".

TABLE 1

| Connective No. | ( ( ii | & pp) | \| qq) | = kk |
| --- | --- | --- | --- | --- |
| 090 | 01 | 01 | 10 | 11 |
| 095 | 01 | 01 | 11 | 11 |
| 106 | 01 | 10 | 10 | 10 |
| 111 | 01 | 10 | 11 | 11 |
| 122 | 01 | 11 | 10 | 11 |
| 127 | 01 | 11 | 11 | 11 |
| 149 | 10 | 01 | 01 | 01 |
| 159 | 10 | 01 | 11 | 11 |
| 165 | 10 | 10 | 01 | 11 |
| 175 | 10 | 10 | 11 | 11 |
| 181 | 10 | 11 | 01 | 11 |
| 191 | 10 | 11 | 11 | 11 |
| 213 | 11 | 01 | 01 | 01 |
| 234 | 11 | 10 | 10 | 10 |

The connective number is the decimal equivalent of the binary digits. For example, binary "11 10 10 10", with most significant on the left, is decimal 234. The connective number is meaningful as an identifier in the mathematical theory of 4vbc. When the 14-combinations of Table 1 are placed in the LUT of 64-entries, the frequency of distribution is sparse as indicated in the four DATA statements of the source code in True BASIC®.

The methodology for building the LUT for nine inputs to one output is disclosed and taught here. Three instances of the table of 64-elements are manipulated to produce all possible combinations. Each combination of three inputs and one output is further checked for the exclusive condition of ii=kk for which that combination is subsequently excluded as null " ". The resulting LUT consists of 64^3 or 262,144 entries, each of which is a 2-tuple, that is, the LUT is indexed by 18-bits or 2^18 entries. In the source code in True BASIC®, this LUT is populated by manipulation of input arrays. In the source code in VHDL, this LUT is enumerated bit-by-bit and occupies over 300-pages of text as elided in the line CONSTANT lut: bit_lut:=(("00"), . . . ("00"));.

This instant LUT for nine inputs to one output contains the values of kk from Table 1 above (indexed base-256), but is rather distributed over a base-64 index, excluding " ", as presented in Table 2.

TABLE 2

| Idx | 22 | 23 | 26 | 27 | 30 | 31 | 37 | 39 | 41 | 43 | 45 | 47 | 53 | 58 |
| --- | --- | --- | --- | --- | --- | --- | --- | --- | --- | --- | --- | --- | --- | --- |
| kk | 11 | 11 | 10 | 11 | 11 | 11 | 01 | 11 | 11 | 11 | 11 | 11 | 01 | 10 |

In Table 2 the 18-bits representing the decimal index values for range of [0, 262143] contain that recurring pattern of kk results in the least significant index digits. This constitutes a new algorithmic theory of learning named the Kanban Cell Neuron Learning Model (KCNLM) for the following reasons. Table 2 satisfies Occam's Razor for presentation of information in its most compact, minimal distance length (MDL). Table 2 also produces results that are deterministic, not probabilistic, and satisfy the requirement to be testable, verifiable, and reproducible. How the 18-bits of nine 2-tuple, in groups of three 2-tuple or otherwise, are assigned is determined by a practitioner in the art. For example, the statement "The King of France is bald, and snow in Hong Kong is falling" may be assigned by a practitioner into two groups of three 2-tuple as 12-bits to yield an equivalent result of 00, contradiction, or absurdum, as follows. The King of France ($ii_1$=11 tautology, because French history has kings) is ($pp_1$=00, because the head of state is now elected, rendering kingship moot) bald ($qq_1$=00, because bald kingship is similarly moot), with $kk_1$=00 absurdum, AND snow ($ii_2$=11) in Hong Kong ($pp_2$=10 false, because snow is unknown there) is falling ($qq_2$=00, because snow is not possible there), with $kk_2$=10 false. These combined expressions as $kk_1$ 00 AND $kk_2$ 10 reduce to 00 absurdum. Note also that if the state of affairs is expressed as the King ($ii_3$=11) was ($pp_3$=01 true) bald ($qq_3$=01), with $kk_3$=01 true, then the combined expressions as $kk_3$ 01 AND $kk_2$ 10 continue to reduce to 00 absurdum.

Based on the behavior of the KCN, an important characteristic of the KCNN follows in the contents of its LUT. For the values of {ii, pp, qq} as {11, 11, 11}, the formula of (ii & pp) |qq=kk as (11 & 11)|11=11 seems intuitive, but is actually mistaken for the KCN here. This is because whenever the condition arises of ii=kk, the KCN is in a state of termination and hence has the value of 00 or null " ". This condition is borne out and consistent with the manual decomposition and interpretation of the 18-bit input code. For example, consider the input of 01 11 11 11 00 11 01 10 10. The respective 6-bit inputs are read with intermediate results as: {11, 00, 10} to produce correctly 10; and not {11, 11, 10} to produce mistakenly 11.

Because of the condition if ii=kk then kk=" " or 00, the values in Table 2 may be shortened in some cases to include only the indexes of 26, 37, 53, and 58, which are in brackets in Table 3. For example, with the powers of 64 as {31, 31, 27}, the blocked 18-bit input of 01 11 11 01 11 11 01 10 11 produces {ii, pp, qq}=kk as {11, 11, 11}=11, where ii=kk, so the result changes as kk=" " or 00. In contrast with the powers of 64 as {32, 31, 27}, the binary input of 10 00 00 01 11 11 01 10 11 produces {ii, pp, qq}=kk as {00, 11, 11}=11, where ii # kk, so the result remains the same as kk=11.

TABLE 3

| Idx | 22 | 23 | [26] | 27 | 30 | 31 | [37] | 39 | 41 | 43 | 45 | 47 | [53] | [58] |
|---|---|---|---|---|---|---|---|---|---|---|---|---|---|---|
| kk | 11 | 11 | [10] | 11 | 11 | 11 | [01] | 11 | 11 | 11 | 11 | 11 | [01] | [10] |

A further exposition of the attributes in Table 1 is when these 14 expressions are mapped into predicate logic, they prove that time is bivalent. LET ii, qq=01 present, 10 past, 11 future; pp=01 verifies, 10 falsifies, 11 proves; kk=01 true, 10 false, 11 proof (The three digit ordinals refer to expressions in a bivalent logical system.):

090 01 01 10=11; Present verifies past.
095 01 01 11=11; Present verifies future.
106 01 10 10=10; "Present falsifies past" is false; hence, Present verifies past.
111 01 10 11=11; Present falsifies future.
122 01 11 10=11; Present proves past;
i.e. Present verifies past OR Present falsifies past:
[090] 01 01 10=11 OR [106] 01 10 10=10==01 11 10=11
127 01 11 11=11; Present proves future;
i.e. Present verifies future OR Present falsifies future:
[095] 01 01 11=11 OR [111] 01 10 11=11==01 11 11=11
149 10 01 01=01; "Past verifies present" is true.
159 10 01 11=11; Past verifies future.
165 10 10 01=11; Past falsifies present.
175 10 10 11=11; Past falsifies future.
181 10 11 01=11; Past proves present;
i.e. Past verifies present OR Past falsifies present:
[149] 10 01 01=01 OR [165] 10 10 01=11==10 11 01=11
191 10 11 11=11; Past proves future;
i.e. Past verifies future OR Past falsifies future:
[159] 10 01 11=11 OR [175] 10 10 11=11==10 11 11=11
213 11 01 01=01; "Future verifies present" is true.
234 11 10 10=10; "Future falsifies past" is false; hence, Future verifies past.

What follows is that time being bivalent (a group, ring, and module) is not a vector space, and hence cannot be a dimension by that definition. This implies: a Cartesian universe of three dimensions only; that time was, just "is", and always will be; that time is everywhere; and that time cannot be escaped. That measured time slows during high speed travel in space, relative to that of a fiducial point in a gravity well, is compatible with time as bivalent.

The KCNN as a two-level network processes random input into a single value in about 1.2% of all results. Table 4 presents examples of the four possible result values, in 2-tuple and in ordinal formats.

TABLE 4

|  | pp | qq | kk |
|---|---|---|---|
| Tuple: ii | | | |
| 11 11 10 | 11 11 11 | 11 01 01 | 01 |
| 11 11 11 | 11 11 11 | 11 10 10 | 10 |
| 11 10 01 | 11 01 11 | 01 11 11 | 11 |
| 11 11 11 | 11 11 11 | 11 11 11 | 00, "", null |
| Ordinal: ii | | | |
| 3 3 2 | 3 3 3 | 3 1 1 | 1 |
| 3 3 3 | 3 3 3 | 3 2 2 | 2 |
| 3 2 1 | 3 1 3 | 1 3 3 | 3 |
| 3 3 3 | 3 3 3 | 3 3 3 | 0, "", null |

Table 4 reiterates the feature that KCNNs favor the collective processing of tautologies because out of the 40 tuple values, 29 are tautologies (70%).

In another embodiment, the KNM system as described below may be a linear, multivariate, clustering formula. For example, the KNM system is linear where there are no exponents in the terms of the expressions. The KNM system is multivariate where multiple variables are possible. Clustering refers to the property that many statistical values may be assigned to a single logical or arithmetic range of a cluster. In an application, for a given sorted range of forty values of a variable or dataset (e.g., trading volume for finance related data or barometric pressure for weather related data), four clusters may successively count each group of the ten values in rank order (e.g., each group of ten values is a cluster). To each such group of values, a distinct logical value is assigned as that distinct cluster value.

This method is distinct from other approaches such as Gaussian distribution-based clustering and from density-based clustering. For example, the Gaussian distribution-based clustering method uses the expectation-maximization [EM] algorithm to group probabilities of sets of fixed points. The density-based clustering method uses the frequency of occurrence as the density criterion for demarking estimated borders of clusters. As such, those other approaches evaluate probabilities rather than the counted data points.

One deficiency with the prediction of time series data in the related art is that as it is based on a vector space, a solution is ultimately not bivalent, is probabilistic, and hence is undecidable. For example, in stock price graphs, a vector may describe the market direction as a directed ray with a starting point. Such a ray can be manipulated by scaling, and many such rays describe a vector space of potentially manipulated vectors. However, that vector space contains an uncountable number of such potential vectors, rather than an exact number.

It is noted that bivalency is not a vector space is disclosed in Colin James III, *Proof of Four Valued Bit Code (4vbc) as a Group, Ring, and Module*, World Congress and School on Universal Logic III, Estoril, Portugal, 2010 ("James 2010"), herein incorporated by reference in its entirety for all purposes. This proof proceeds by defining a vector space as having an additive table with 0 as the identity element and having a multiplicative table with 1 as the identity element. However with 4vbc in 2-bits, the vector space of a small finite field of four elements is inconsistent for such truth tables for AND (multiplication) and OR (addition). The proof then identifies what 4vbc is, namely, as an Abelian group under addition, as a monoid group under multiplication, as a ring under commutation, and as an R-module under commutation.

Another deficiency with the related art to predict time series is statistical metrics which rely on margins of error (ME) such as: absolute error (AE), mean average error (MAE), mean absolute percentage error (MAPE), and mean of multiple MAPE (MMAPE). These artifices make the assumption that the time series is not inherently linear, that it is non-linear. As such, it requires the use of calculus with differential equations. However, by their own definition, such methods derive probabilistic results by approximation, are consequently not exact and bivalent, and hence are ultimately undecidable.

Yet another deficiency with the related art to predict time series is the assumption that the method of prediction is classified as statistical, physics-based, data mining, or a hybrid of the above. This means that such methods of predictions are based on probabilistic assumptions for the manipulation of data and hence not linear and bivalent.

FIG. 12 illustrates an exemplary statistical time series of market data for the stock issue HBAN (Huntington Bancshares).

Referring to FIG. 12, market data 1200 for stock issue HBAN is listed over a time period 1210 from Aug. 8, 2013 to Aug. 23, 2013, as collected daily in that time period 1210 by the date column 1211. The corresponding market values 1220 for each date 1211 is listed in the corresponding row from the specific date. The market values 1220 that are listed are closing price 1221, trade volume 1222, opening price 1223, high price 1224, and low price 1225.

FIG. 13 illustrates an exemplary statistical time series of natural data for the weather station YOW (International Airport, Ottawa, Canada).

Referring to FIG. 13, natural data 1300 recorded at the weather station YOW is listed over a time period 1310 from Oct. 30, 2013 at 8 pm to Oct. 31, 2013 at 3 am, as collected hourly in that time period 1310 by the date column 1311. The corresponding natural values 1320 for each hour 1311 is listed in the corresponding row from the specific hour. The natural values 1320 that are listed are the dew point 1321, the pressure 1322, the relative humidity 1323, the dry temperature 1324, and the wind speed 1325 (The wind speed 1325 is a natural value; however, it will be used here for comparison with predicted values for exemplary purposes and not as data points, as will be discussed below).

It is noted that both the market data 1200 and the natural data 1300 are used as explanation of an application the KNM system according to an embodiment as described below. The statistical time series data may be of other types (e.g., commodity, currency exchange (FOREX), or other data) and for other time periods (e.g., at shorter or longer time period) and at other time intervals (e.g., monthly, yearly, or at variable intervals).

In an application for a statistical time series (e.g., market data 1200 or natural data 1300), the input variables from a statistical time series are assigned one of four logical values based on one of four clusters into which the statistical value is indexed as logical values of the list <"01", "10", "11", "00"> or respective numerical values of the list <1, 2, 3, 0>.

Clusters may be determined by rank order of statistical values in ascending or descending order. If C-clusters are of interest, then C-logical values are required for a radix-C number of N-statistical values, such that N modulo C=0 or the Remainder(N/C)=0, according to an embodiment. For example, if 4-clusters are of interest, then the 4-logical values of the list <"01", "10", "11", "00"> require a radix-4 number of N-statistical values. Here, N-statistical values are the total number of values for a particular statistic of interest in a data set. In another embodiment, the clusters may be assigned to logical values using other methods as known in the art or may be later derived (e.g., hashing functions).

Three of such input values (e.g., three of the market values 1220 for the market data 1200 or three of the natural values 1320 for the natural data 1300) are assigned respectively to the logical variables or to arithmetic variables in Equations 5 and 6 as follows.

In the Equations 5 and 6, the logical variables are named antecedent (ii), consequent (pp), resultant (ii∧pp), and then antecedent (resultant ii∧pp), consequent (qq), and resultant (kk) as:

$$(ii_1 \wedge pp_1) \vee qq_1 = kk_1, \text{ where } \wedge \text{ is AND and } \vee \text{ is OR.} \quad \text{Equation (5).}$$

It is noted that Equation 5 corresponds with Equation 1 as described above.

The arithmetical variables are named multiplicand (ii), multiplier (pp), product (ii*pp), and then augend (product ii*pp), addend (qq), and sum (kk) as:

$$(ii_1 * pp_1) + qq_1 = kk_1, \text{ where } * \text{ is multiply and } + \text{ is add.} \quad \text{Equation (6).}$$

In Equation 5, there are 64-combinations of 2-tuple (or dibits) of the list <"00", "01", "10", "11"> (for the various combinations of ii, pp, and kk). Each of these combinations is used for evaluation.

The three input variables are named "ii", "pp", and "qq" for the respective variables of interest in a time series as determined by the practitioner. The output variable is named "kk" for the result. Input values from the logical values of the list <"01", "10", "11", "00"> are assigned to the logical variables in Equation 5. Input values from the numerical values of the list <1, 2, 3, 0> are assigned to the arithmetic variables in Equation 6.

The type of statistical data within a time series determines how data are assigned to respective variables. For example, with reference to the market values 1220 as illustrated in FIG. 12, the assignment of ii, pp, qq may be to the respective cluster value for the high price 1224, the low price 1225, and the volume 1222. As stated, the assignment of ii, pp, and qq may also be of other statistics/values of interest (e.g., the closing price 1221 and the opening price 1223). In this example, the rank order of the respective variables volume 1222, low price 1225, and high price 1225 are descending. This means that logical values for the respective cluster groups are assigned in descending order to those statistics. For example, the statistical group with the largest values is assigned to the cluster group "11" of the largest value. (By contrast, if a statistic is sorted in ascending order, the cluster group "11" of the largest value is assigned to the statistical group of the smallest values.)

In another example, the KNM system may be used for other statistical values (e.g., commodity trade values). In an exemplary embodiment using commodity trade values, the independent variables of ii, pp, and qq may be assigned to the respective cluster values for changes in the long position, short position, and open interest in the market or other related statistical values.

In another example with natural values 1320 as illustrated in FIG. 13, the assignment of ii, pp, qq may be to the respective cluster value for dry temperature 1324, relative humidity 1323, and pressure 1322. In this example, variable rank orders of ascending and descending assignment may be used. For example, the rank order of pressure 1322 is ascending, and the rank orders of dry temperature 1324 and relative humidity 1324 are descending. The cluster values of predicted as observed wind speed 1326 and random as expected wind speed 1327 are descending. In another embodiment, the rank order as assigned to the cluster values may be by other methods (e.g., hash function, formula, look-up table, or other methods).

The wind speed 1325 listed in the natural values 1320 is the recorded statistic from the weather station for informational and comparison purposes. The predicted as observed wind speed 1326 is the logical value for the cluster of the wind speed as predicted from Equation 5 above. The random as expected wind speed 1326 is for statistical analysis by contingency test and in contrast to the predicted as observed wind speed 1326. For example, the random as expected wind speed 1327 may be derived randomly and is a cluster value which represents four equally probable values in the list <"00", "01", "10", "11">. With wind speed predictions of 800 consecutive points in time, one fourth or 200 points in time are expected to be predicted randomly for each cluster value. Four possible expected values are within each such cluster. Hence any given cluster value predicting that same cluster value randomly is one fourth of 200 points in time or 50 points in time.

The KNM maps the output signals according to user defined rules which are determined by the type of data within the statistical time series.

For example, in the case of statistical time series for market data 1200 as illustrated in FIG. 12, an application according to an embodiment may be to determine profitable sell and buy signals. For discrete stock issues, this may be accomplished by viewing all pairs of signal results from the period of interest in the time series. For the market data 1200, this series may be from dates 1211 of Sep. 16, 2013 to Sep. 18, 2013. For a period of interest, the beginning date of the range may be defined as the oldest date in the time series, and the ending date of the range is defined as the most recent date in the time series.

In this example, meanings of the four logical values of the 2-tuple are defined as actions based on the closing prices of stock issues in this list: <"sell on close price up", "buy on close price down", "trade on close price no change", "trade on close price does not exist">. The value "sell on close price up" may mean profit is taken by selling a lower position at a higher price. The value "buy on close price down" may mean a new position is taken by buying at a lower price. The value "trade on close price no change" means a position is changed with no profit and no loss. The value "trade on close price does not exist" means a position does not change because there is no market at that time. Basing the four logical states on opening prices of stock issues is also possible. There may be an advantage of using the opening prices to avoid end of day price manipulation to drive close price down by dealers trading a small volume at a lower price.

In an embodiment, the last two states listed (e.g., "trade on close no change" and "trade on close does not exit") may be effectively ignored in KNM because of no profitability.

FIG. 14 illustrates examples of profitable trade signals for the stock issue symbol HBAN (Huntington Bancshares) after an application of the KNM.

Referring to FIG. 14, the date ranges and periods of the data 1400 show profit based on the trading signals 1411 after an application of the KNM in the market period of 2007 to 2009, encompassing the market extrema of 2008. The trade signals 1411 list each signal that corresponds with a determined sell or buy signal for that period 1424. Each signal may correspond with an input set of ii, pp, and qq to the KNM.

There were no profitable signals for HBAN in the period range before 2009 (as therefore not shown in the market data 1400). This means that the KNM effectively avoided the trading of HBAN during the market extrema of 2008. It is noted that HBAN is generally considered to be the most difficult issue for which to predict trading signals in that market period.

Of unique interest to the method as applied to signal data 1400 is the size of a period 1424. The number of market days in a period 1424 can be limited by the practitioner to whole multiples of years from one to four years, that is, from about 252 market days per year to 1008 market days. Trade days 1421 refer to the number of trading days or frequency within a date range from the start data 1422 to the end date 1423 during which the profitable trading signals in 1411 are active. Variable periods are non recurring among stock issues because some publicly available time series have more historical data than do others. The profitability of signals for shorter periods is sometimes extended to longer periods. The shorter periods are less than one year such as 64-, 128-, and 192-market days. The longer periods are extended one, two, three, and four years or 252-, 504-, 756-, and 1008-market days. Through this process, the consistently profitable signals for an issue may be determined over the periods.

With reference to FIG. 12, of another unique interest to the method as applied to market data 1200 is initial settling (IS) which rejects a user-defined number of consecutive buy signals subsequent to the most recent sell signal. For example, if a sell signal is for a date 1211 of 8/20/2013 and a buy signal is for each consecutive date 1211 of 8/21/2013 to 8/23/2013, the initial settling of three days would delay the next buy date to 8/23/2013. IS has the quantitative effect to watch closing prices settle in anticipation of buying again after a selling trend. By rejecting several initial buy signals, IS improves profitability by about 5%.

With further reference to FIG. 14, of yet another unique interest to the method as applied to market data 1400 is a requirement for selecting profitable pairs of signals. Such a requirement is that the buy signal does not appear elsewhere as a sell signal in another pair of profitable signals. For example, in a trade signal 1411 for the trade signal pair of 110 002, the sell signal part of 110 nnn would not be valid and would be rejected if a buy signal part of nnn 110 is found in the market period. It would be contradictory to associate a trade signal 1411 with both a sell and a buy. In other words, a particular trade signal 1411 is one and only one of a sell signal, a buy signal, or is discarded because of contradiction or by other criteria.

FIG. 15 is a detailed example for the statistical tabulation and results of weather data from the Canadian weather station at YOW (Ottawa International Airport).

In the example case of statistical time series for natural values, the required purpose is to determine predicted wind speed in contrast to random wind speed (e.g., the predicted as observed wind speed 1326 and the random as expected wind speed 1327 for the natural data 1300).

Of unique interest to the method as applied to natural values in the statistical tabulation 1500 are the random prediction as expected 1531. If wind speed is effectively random with a range of local parameters, then the expected value of the four clusters should be equally distributed within that range as N/4.

Of another unique interest to the statistic tabulation 1500 is the cluster "11" in column 1511 with calculated prediction as observed value 1521 of 96 is over 200% more than the random prediction as expected value 1531 of 46.

Of yet another unique interest is that the statistical method is adopted as a collection of observed and expected values for an N-by-M contingency test, with the Chi-square test ($\chi^2$) as a subset of the contingency test, where contingency results 741 have a statistical significance of Fisher P<=0.01 1551.

In another embodiment, the three variable inputs of ii, pp, qq, and result kk may be extended to a plurality of KCMs. Referring to FIG. 9B, a plurality of N-variables is input into a result. For example, the result 924b is tabulated for a series of previous results as 901b to 909b, each of which served as an output result variable from a previous KCM.

The method named combinatorial contrast (CMBCTR) may be used to determine the most meaningful results in the list $<kk_0, kk_1, \ldots, kk_{n-1}, kk_n>$. In some empirical studies, the criterion for contrasting results is known, and the number of relevant input variables is obvious and further limited.

For example, in an application of stock issue prediction, more profitable results imply a criterion for contrasting results. Referring to FIG. 12, given the five statistics for closing price 1221, volume 1222, opening price 1223, high price 1224, and low price 1225, three are chosen for the input of ii, pp, qq (e.g., high price 1224 and low price 1225 (to capture the trading price range) and volume 1222 (to capture trading activity)). The closing price 1221 may be relevant as an arbitrary measure for profit in contrast to other closing prices for other stocks. (The opening price 1223 could also be used consistently instead because, on smaller volumes of trading, the closing price 1221 may be prone to manipulation by dealers at the end of the trading period.)

For studies without a priori goals, the strategy for CMBCTR is to visit all possible statistics as potentially meaningful input variables to the KCM. For example, with the natural data 1300 with reference to FIG. 13, the statistics are for disparate variables such as dew point 1321, pressure 1322, relative humidity 1323, dry temperature 1224, and wind speed 1225. Some statistics are known to be related in general such as higher pressure implying lower wind speed. However, a relationship between other statistics may not be apparent. Therefore, CMBCTR may be used to evaluate all combinations.

The relative sorting order of statistics as descending or ascending makes evaluation more complex for potential relationships between statistics. In an embodiment, such permutations are evaluated in programming software by implementation in nested loops.

In another embodiment, different CMBCTR's apply to different types of time series such as financial and natural data.

FIG. 16 illustrates a method of predicting time series according to an embodiment.

In an embodiment, the method 1600 may use an instance of the KCM for predicting time series.

The method 1600 starts with step 1601 to set the range of a time series to extrema dates or times of interest for the study. For example, referring to the market data 1200 and the natural data 1300, the ranges at dates 1211 and hours 1311 respectively. Step 1601 is the basis of the entire process because it affects all other subsequent steps.

In step 1602, the period of the range for the number of data points to process for each predicted variable is set. Step 1602 affects all other subsequent steps.

With respect to step 1602, with financial data for example, if the period is 252 trading days in a year, then each predicted data point is based on the 252 trading days as preceding it. Historical periods may be recurring or non recurring. In an embodiment, recurring historical periods may be arbitrarily selected for 64-, 128-, 192-, 252-, 504-, 756-, and 1008-trading days (0.25, 0.5, 0.75, 1, 2, 3, and 4 years). The maximum number of trading days remaining in a series is a non recurring period because some issues have more historical data than others. In other words, not all issues have time series of trading days for as long as up to ten years.

With natural data for example, if the period is 24 hourly weather station readings in a day, then each predicted data point may be based on the 24 hourly readings preceding it.

In an embodiment, the period of the range may depend on the predominately cyclical (recurring) component of the time series.

In step 1603, a statistic type is assigned to a KCM variable such as ii, pp, qq. For example with financial data, Step 1603 could assign trading volume to qq. For example with natural data, Step 1603 could assign barometric pressure to qq.

In step 1604 the statistical values assigned to a variable is sorted into descending or ascending order. Criteria determine the particular sort order based on one practiced in this art. The sort order for a variable in Step 1604 affects all other subsequent steps. The number of values sorted (N) is obtained for the subsequent Step 1605.

In step 1605, the boundaries of the number of groups (M) or clusters for the variable is determined according to criteria. Because 4vbc is used, then there are four groups (M=4) designated in the list <0, 1, 2, 3>. The interval of such a sorted list of values is N/M=4 where N is the number of sorted values from the previous step 1604. The beginning and ending positions of the values for the boundaries of a group may be obtained by Equation 7a and Equation 7b below.

Begin position: $(((3-N))*(N/M)+1)$      Equation (7a).

End position: $(((3-N)+1)*(N/M))$      Equation (7b).

In step 1606, each cluster value is assigned as bits or ordinals and for descending or ascending order, respectively, as: <11, 10, 01, 00> or <3, 2, 1, 0>; and <00, 01, 10, 11> or <0, 1, 2, 3>. If more variables are needed for assignment to other statistics in the time series, then step 1606 redirects back to step 1603 for that purpose. If enough variables are assigned, then step 1606 proceeds to step 1607.

In step 1607, the variables are processed by the KCM as given by formula 60 of FIG. 6, where item 601 contains the input set of KCM variables from iteration through Step 1603 above.

In step 1608, a decision is made to accept or reject signal results from step 1607. In an embodiment, the decision may be made based on studies of empirical results from individual or collective applications of various datasets. For example, the criteria for rejection may include: 1. If ii or pp=kk, then the kk result is ignored; and 2. If kk or pp # bits "11" (ordinal 3), then the kk result is ignored. In empirical studies of financial data for US Treasuries and commodities, those criteria were applied. However, in subsequent studies of financial data for the SP500 and natural data for wind speed, these criteria were relaxed and ignored. The decision in step 1608 may fall through to step 1609.

It step 1609, it is determined if the acceptable results have significant meaning and usefulness. Step 1609 evaluates all possible combinations of pairs of signals for statistical significance using combinatorial contrast (CMBCTR).

For example, in financial data, profitability is calculated from the closing values for pairs of consecutive sell and buy signals. Therefore, one requirement is that the buy signal does not appear elsewhere as a sell signal in another pair of profitable signals (i.e., there is no conflicting signals for a period). For overall prediction of profitability of an issue, another requirement is that no buy signal appears at the end of a period without a previous corresponding sell signal to determine profit (i.e., a buy signal should precede a sell signal). The profitability of signals for shorter periods are extended to longer periods. The shorter periods may be less than one year such as 64-, 128-, and 192-trading days. The longer periods may be extended to one, two, three, and four years or 252-, 504-, 756-, and 1008-trading days. It is this process that determines profitable signals for an issue over periods.

In another example for natural data, each result is contrasted to the recorded statistic to determine the significance of signals.

In an embodiment, the step 1609 may include heuristics for automation in the CMBCTR process for known statistic data types. For example, with financial data, the heuristics may include the rules for profitability as given above for accepting or ignoring a signal for a given investment type (e.g., commodity, treasury bill, stock, FOREX, and subtypes each (e.g., market capital, industry sector, listed exchange, currency pairs, etc.)), where the rules are based on known criteria for the investment type. In another embodiment, a user's analysis may be needed to sort the signals and to develop rules for heuristics for the data type.

In step 1610, the significant signals are collected and tabulated. For example, with financial data, step 1610 presents predicted profitable buy and signal signals for the time series range and period. For example, with natural data, step 1610 presents the predicted statistic that matches the recorded statistic.

Several studies have been done as examples of the KCM according to embodiments. Some of the studies presented in summary herein are the 10-year US Treasury bond, the commodity of silver, random stock issues of the SP500 and in particular two difficult bank share issues, and wind prediction.

The 10-year treasury study is in part disclosed in Colin James III, *Recent Advances in Algorithmic Learning Theory of the Kanban Cell Neuron Network*. IEEE Proceedings of International Joint Conference on Neural Networks. IJCNN, [August] 2013 ("James 2013"), herein incorporated by reference in its entirety for all purposes. The Supervisory Adverse Scenarios (SAS) in the 20-quarters (Qs) from 2008.3 to 2013.2 were tested. The variables ii, pp, qq were assigned respectively to the percentage yield, price of gold, and monthly duration. The monthly duration was constant throughout the study and hence could be ignored. For the logical analysis, the kk results "00" are invalid logical results, the kk results "11" are valid logical results. This results in 14-Qs being considered as having meaningful percentages of yield, but not 6-Qs. A contingency test showed predicted results of percentage yield were significant at the Fisher $P<0.001$.

The silver commodity study was for the 72-week period of Jan. 3, 2012 to May 14, 2013. The variables ii, pp, qq were assigned respectively to change in positions of long, short, and open interest. There were 17 trades for 11 buys and 6 sells, all profitable. The results were tested against two random samplings for the statistics in the period, both of which failed profitability. This study effectively invalidated the efficient market hypothesis [EMH].

The study of the SP500 used random selection with replacement to select a sample of 96 stock issues, 2 of which were chosen two times. The study was for the period of 512 trading days from Oct. 8, 2007 to Oct. 10, 2009. This period was purposely chosen to capture the exemplary extrema of 2008 market phenomena. No criteria to exclude signals were used; all pairs of signals in combination were considered. No issues were found to have periods without profitable signals and consequently not traded; all 96 issues were profitable based on buy-sell trading predictions from KCM. Two of the most difficult issues to predict were bank share stocks with symbol names of HBAN and MTB (M&T Bank Corporation). Those results are presented in Table 5. An end date with the letter "a" in Table 5 represents avoided trades during the 2008 extrema. The trade signals are for sell and buy signals in ordinals. For example, the digits 110 002 mean the sell signal was 110 for respectively ii, pp, qq as 01, 01, 00; and the buy signal was 002 for respectively ii, pp, qq as 00, 00, 10.

Referring to Table 5, further details of the market data 1400 as illustrated in FIG. 14 are presented. HBAN is known to be one of the most difficult issues to predict within the range tested of 2007 to 2009.

TABLE 5

| Issue | Trade signal | End date and period(t) | Sell date | Sell close | Buy date | Buy close |
|---|---|---|---|---|---|---|
| HBAN | 111 002 | 2009.09.21.504 | 2009.09.29 | 4.40 | 2009.09.28 | 4.20 |
| | | | 2009.09.23 | 4.37 | 2009.09.02 | 3.93 |
| | | | 2009.08.10 | 4.77 | 2009.07.06 | 3.91 |
| | | | 2009.06.24 | 4.37 | 2009.05.28 | 4.03 |
| | | | 2009.05.11 | 5.71 | 2009.02.03 | 1.81 |
| | | | 2008.06.13 | 6.53 | | |

TABLE 5-continued

| Issue | Trade signal | End date and period(t) | Sell date | Sell close | Buy date | Buy close |
|---|---|---|---|---|---|---|
| MTB | 110 002 | 2009.10.19.756 | 2009.08.26 | 61.46 | 2009.08.14 | 60.02 |
| | | | 2009.08.10 | 61.62 | 2008.12.24 | 55.93 |
| | | | 2008.12.05 | 67.88 | 2008.12.02 | 59.84 |
| | | | 2008.11.25 | 64.38 | 2008.11.19 | 56.14 |
| | | | 2008.10.28 | 80.55 | | |
| MTB | 110 002 | 2009.09.23.504a | 2009.07.27 | 59.53 | 2009.02.12 | 45.46 |
| | | | 2008.12.26 | 55.39 | | |

The wind prediction study was for the weather station YOW at Ontario International Airport for the period of the month of October, 2013 at hourly readings. The variables ii, pp, and qq were assigned respectively to dry temperature, relative humidity, and pressure. The variable pressure was sorted in ascending order which means the cluster values assigned were 11 for least pressure and 00 for greatest pressure.

Referring to FIG. 15, the calculated prediction for the resulting wind speed in the range of cluster for the highest speed was statistically significant in item 1551 at Fischer $P<0.01$.

The formula of KNM of $(ii*pp)+qq=kk$ maps a profit and loss formula in Equation 8:

$$(\text{probability of successful outcome}*\text{cost})+(-1*\text{cost}) = \text{net(profit or loss)} \qquad \text{Equation (8)}.$$

where: $ii \geq 0.0$ and $pp \geq 0.0$; but if $ii=0.0$ and $pp=0.0$ then net loss=cost.

In an embodiment, the method 1600 may be used in conjunction with other analysis methods predicting a subject that includes historical time series data. For example, in a financial analysis application, the method 1600 may be used for predicting the cyclical or recurring component of historical data, while another analysis method (e.g., a qualitative analysis) may be used to predict factors not cyclical or recurring (e.g., factors affecting the particular subject).

Although the exemplary embodiments are described herein, the present invention is applicable to machine cognition, as will be appreciated by those skilled in the art(s).

Further, systems described can include at least one computer readable medium or memory for holding instructions programmed according to the teachings of the invention and for containing data structures, tables, records, or other data described herein. Common forms of computer-readable media can include, for example, a floppy disk, a flexible disk, hard disk, memory disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to one or more network. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

While the present invention was described in connection with a number of exemplary embodiments and implementations, the present invention is not so limited but rather covers various modifications and equivalent arrangements, which fall within the purview of the appended claims.

What is claimed is:

1. A method of predicting time series, comprising:
setting a range of the time series and a period of the range;
clustering and assigning variables of the time series to a combinatorial logic model;
processing the combinatorial logic model on the variables for one or more results;
accepting or rejecting one or more of the results and the corresponding variables of the results as signals;
evaluating the signals by combinatorial contrast criteria for significant signals; and
applying the significant signals to the time series as predictions.

2. The method of claim 1, wherein the combinatorial logic model comprises a Kanban neuron model (KNM).

3. The method of claim 2, wherein the time series comprises three or more variables, and wherein the assigning the variables comprises selecting three variables of the time series.

4. The method of claim 2, wherein the clustering the variables comprises separating each of the variables into four groups for each variable.

5. The method of claim 1, wherein the clustering the variables comprises calculating boundaries of each of the variables.

6. The method of claim 1, further comprising sorting each of the variables prior to the clustering.

7. The method of claim 2, wherein the KNM comprises a final result of three first layer cell units and one second layer cell unit in a network structure, wherein each of the cell units comprises combinatorial logic for processing an AND operation between a first input and a second input and combinatorial logic for processing an OR operation between a result of the AND operation and a third input, wherein the first, second, and third inputs of the first layer cell units comprise respective values of the variables in the range and the period, wherein the first, second, and third inputs of the one second layer cell unit comprise a respective result of the three first layer cell units, and wherein the final result comprises the result of a result of the one second layer cell unit.

8. The method of claim 7, wherein the final result is pre-processed using a look-up table (LUT) for inputs of the respective values of the variables in the range and the period.

9. The method of claim 1, wherein the combinatorial contrast criteria comprises determined useful signals for a particular application of the time series.

10. The method of claim 1, wherein the time series comprises one of financial data and natural data, wherein the financial data includes one of stock data, treasury bill data, commodity data, and FOREX data, and wherein the natural data includes weather data.

11. An apparatus for predicting time series, comprising:
a combinatorial logic model; and
a non-transitory computer readable medium storing instructions for
setting a range of the time series and a period of the range;
clustering and assigning variables of the time series to the combinatorial logic model;
processing the combinatorial logic model on the variables for one or more results;
accepting or rejecting one or more of the results and the corresponding variables of the results as signals;
evaluating the signals by combinatorial contrast criteria for significant signals; and
applying the significant signals to the time series as predictions.

12. The method of claim 11, wherein the combinatorial logic model comprises a Kanban neuron model (KNM).

13. The method of claim 11, wherein the clustering the variables comprises calculating boundaries of each of the variables.

14. The method of claim 11, wherein the non-transitory computer readable medium further comprises sorting each of the variables prior to the clustering.

15. The method of claim 12, wherein the KNM is configured to evaluate a final result of three first layer cell units and one second layer cell unit in a network structure, wherein each of the cell units comprises combinatorial logic for processing an AND operation between a first input and a second input and combinatorial logic for processing an OR operation between a result of the AND operation and a third input, wherein the first, second, and third inputs of the first layer cell units comprise respective values of the variables in the range and the period, wherein the first, second, and third inputs of the one second layer cell unit comprise a respective result of the three first layer cell units, and wherein the final result comprises the result of a result of the one second layer cell unit.

16. The method of claim 15, wherein KNM is configured as a pre-processed look-up table (LUT) configured to evaluate the final result from inputs of the respective values of the variables in the range and the period through the LUT.

17. The method of claim 11, wherein the combinatorial contrast criteria comprises determined useful signals for a particular application of the time series.

18. The method of claim 11, wherein the time series comprises one of financial data and natural data, wherein the financial data includes one of stock data, treasury bill data, and commodity data, and wherein the natural data includes weather data.

19. A non-transitory computer readable medium comprising instructions for
setting a range of the time series and a period of the range;
clustering and assigning variables of the time series to a combinatorial logic model;
processing the combinatorial logic model on the variables for one or more results;
accepting or rejecting one or more of the results and the corresponding variables of the results as signals;
evaluating the signals by combinatorial contrast criteria for significant signals; and
applying the significant signals to the time series as predictions.

20. The non-transitory computer readable medium of claim 19, wherein the combinatorial logic model comprises a Kanban neuron model (KNM), wherein the KNM is configured to evaluate a final result of three first layer cell units and one second layer cell unit in a network structure, wherein each of the cell units comprises combinatorial logic for processing an AND operation between a first input and a second input and combinatorial logic for processing an OR operation between a result of the AND operation and a third input, wherein the first, second, and third inputs of the first layer cell units comprise respective values of the variables in the range and the period, wherein the first, second, and third inputs of the one second layer cell unit comprise a respective result of the three first layer cell units, and wherein the final result comprises the result of a result of the one second layer cell unit.

* * * * *